United States Patent
Johnstun et al.

(10) Patent No.: US 11,511,678 B2
(45) Date of Patent: Nov. 29, 2022

(54) ARTICLE MOUNTING SYSTEM FOR A VEHICLE

(71) Applicant: Polaris Industries Inc., Medina, MN (US)

(72) Inventors: Jeremiah T. Johnstun, Elk River, MN (US); Daniel L. Goffman, Cocolalla, ID (US); Michael C. Leighton, Excelsior, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/380,126

(22) Filed: Jul. 20, 2021

(65) Prior Publication Data

US 2022/0024390 A1   Jan. 27, 2022

Related U.S. Application Data

(60) Provisional application No. 63/056,201, filed on Jul. 24, 2020.

(51) Int. Cl.
*B60R 11/00* (2006.01)

(52) U.S. Cl.
CPC ......... *B60R 11/00* (2013.01); *B60R 2011/004* (2013.01); *B60R 2011/0075* (2013.01)

(58) Field of Classification Search
CPC .............. B60R 11/00; B60R 2011/004; B60R 2011/0075
See application file for complete search history.

(56) References Cited

U.S. PATENT DOCUMENTS

| | | | |
|---|---|---|---|
| 5,871,318 A | 2/1999 | Dixon et al. | |
| 9,969,318 B2 | 5/2018 | Lanigan, Sr. et al. | |
| 10,683,963 B2 * | 6/2020 | Schroeder | F16M 13/02 |
| 2006/0257225 A1 | 11/2006 | Klinkman et al. | |
| 2014/0374564 A1 * | 12/2014 | Schroeder | B60P 7/0815 248/503 |
| 2022/0032821 A1 * | 2/2022 | Parker | B60N 2/0806 |

FOREIGN PATENT DOCUMENTS

EP   2607162 A2   6/2013

OTHER PUBLICATIONS

International Search Report and Written Opinion regarding International Application No. PCT/US2021/042937, dated Jan. 12, 2022.

* cited by examiner

*Primary Examiner* — Anita M King
(74) *Attorney, Agent, or Firm* — Harness, Dickey & Pierce, P.L.C.

(57) ABSTRACT

A retainer has a housing comprising a plunger receiver having a slot disposed therein and an outer wall comprising a lever opening. A plunger has a body and a foot. The body comprises a pin opening. A pin is disposed in the pin opening and the slot. A lever is rotatably coupled to the housing at the lever opening and operably coupled to the plunger. The lever has a first end extending within the housing. The first end rotates relative to the housing within the lever opening. The first end comprising a cam and a pin opening receiving the pin. A spring is disposed between the housing and the plunger within the plunger receiver. The spring urging the foot away from the plunger receiver. A cam engaging surface is disposed within the housing retaining the first end of the lever in the lever opening.

17 Claims, 41 Drawing Sheets

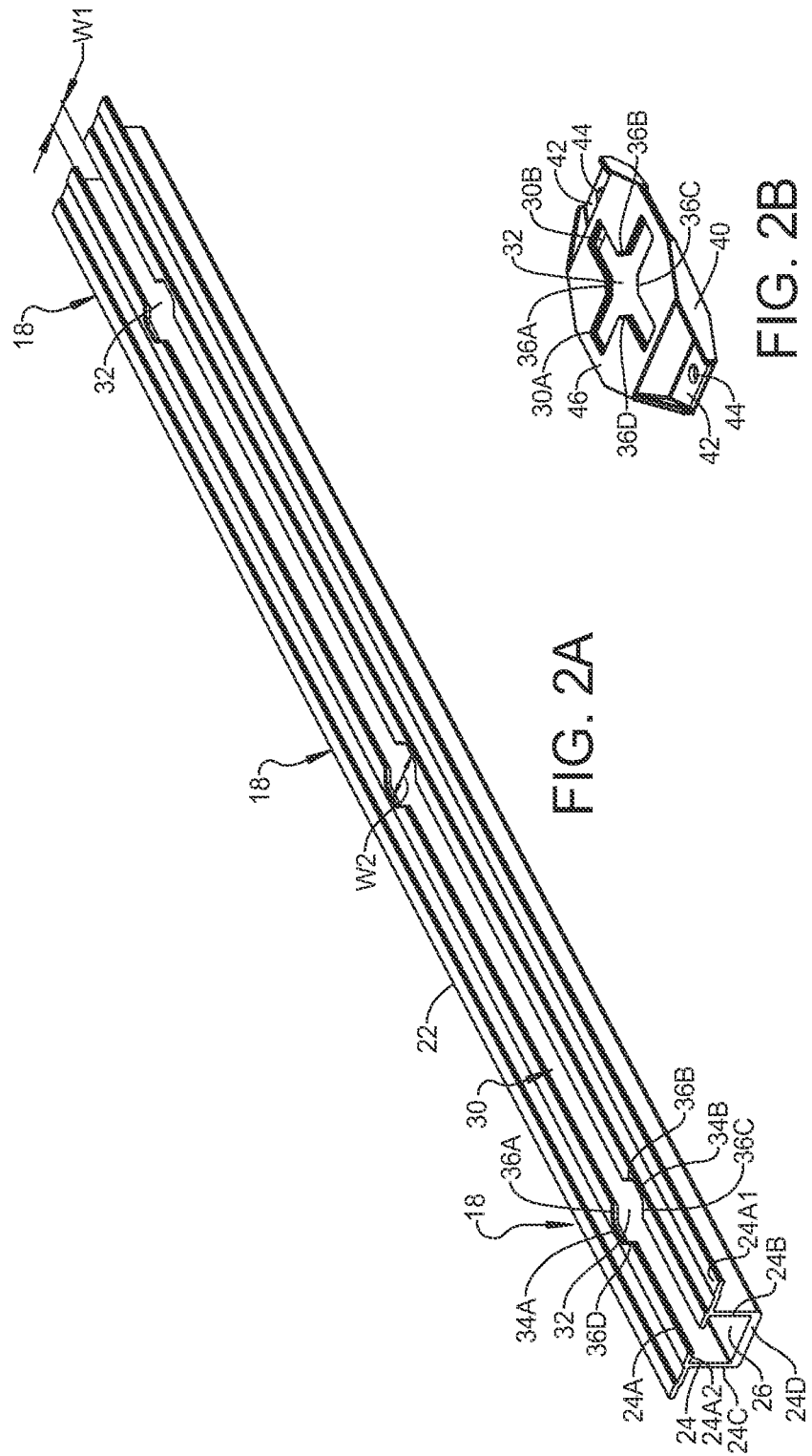

ARTICLE MOUNTING SYSTEM FOR A VEHICLE

CROSS-REFERENCE TO RELATED APPLICATION

This application claims the benefit of U.S. Provisional Application No. 63/056,201, filed on Jul. 24, 2020. The entire disclosure of the above application is incorporated herein by reference.

FIELD

The present disclosure relates to a system for holding articles or implements carried by a vehicle, more particularly, to a retaining system and a retention device for a securing implements and articles to a vehicle.

BACKGROUND

This section provides background information related to the present disclosure which is not necessarily prior art.

Vehicles such as cars, trucks and all-terrain vehicles are used for hauling various articles such as tools, utensils, coolers and other equipment. Securing the articles to the vehicle while the vehicle is moving to prevent loss or damage is important. This prevents the articles from shifting and reduces the amount of distraction to the vehicle operator. Flexibility for mounting positions as well as the ability to accommodate various sized articles improves the utility of the system.

SUMMARY

This section provides a general summary of the disclosures, and is not a comprehensive disclosure of its full scope or all of its features.

The present disclosure provides a retaining system that allows flexibility in the types of articles and the position of the article relative to the vehicle or mounting structure.

In one aspect of the disclosure, a retainer system for coupling an article includes a retainer. The retainer comprises a housing comprising plunger receiver having a slot disposed therein. The housing comprises an outer wall comprising a lever opening. A plunger has a body at least partially and movably received within the plunger receiver and a foot disposed outside of the plunger receiver. The body comprises a pin opening. A pin is disposed in the pin opening and the slot. A lever rotatably coupled to the housing at the lever opening and operably coupled to the plunger. The lever has a first end extending within the housing and is rotatably coupled to the housing. The lever comprises a second end. The first end rotating relative to the housing within the lever opening. The first end comprising a cam and a pin opening receiving the pin. A spring is disposed between the housing and the plunger within the plunger receiver. The spring urging the foot away from the plunger receiver. A cam engaging surface is disposed within the housing retaining the first end of the lever in the lever opening.

In another aspect of the disclosure, a retainer has a base having a first side having an engagement member extending therefrom and a second side. The base comprising a base opening therethrough. A plunger has a body and a flange extending from the body. A lever member has a lever opening therethrough. The lever opening is sized to receive the body. The lever opening is smaller than the flange. A cover is coupled to the base. The cover comprises a first cover opening. The lever member comprises a first end rotatably coupled to the base or the cover or both. The lever has a second end extending through the first cover opening. A spring is disposed between the cover and the plunger. The spring is retractably urging the plunger into the first cover opening and the base opening.

In yet another aspect of the disclosure, a method of operating a retainer system comprising an outer wall forming a channel having an elongated opening having a first width and a second opening having a second width greater than the first width includes inserting an engagement member into the second opening, sliding the engagement member to engage the outer wall adjacent the elongated opening, retracting a plunger into a base, when the plunger aligns with the second opening, urging the plunger into the second opening and retracting the plunger from the second opening by moving a lever member away from the outer wall and engaging a catch extension of the lever member to a cover that is coupled to the base.

In yet another aspect of the disclosure, a retainer system includes a retainer that has a retainer button comprising a circumferential groove at a first end, an engagement member comprising a threaded portion, and a base having a first side having comprising a threaded recess for engaging the threaded portion. A cover is fixedly coupled to the base. The cover comprises a receiving opening sized to receive the first end of the retainer button therethrough. A rotating member is rotatably coupled between the cover and the base. The rotating member, in a first position urges a securing member into the circumferential groove and in a second position withdrawing the securing member out of the circumferential groove.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 2A is a perspective view of a first example of a receiver being a channel.

FIG. 2B is a perspective view of a receiver being a bracket.

Corresponding reference numerals indicate corresponding parts throughout the several views of the drawings.

DETAILED DESCRIPTION

Example embodiments will now be described more fully with reference to the accompanying drawings. Although the following description includes an example of a utility vehicle application, it is understood that the features herein may be applied to any appropriate vehicle, such as motorcycles, all-terrain vehicles, side by sides, mopeds, scooters, cars trucks, sport utility vehicle, etc. The examples disclosed below are not intended to be exhaustive or to limit the disclosure to the precise forms disclosed in the following detailed description. Rather, the examples are chosen and described so that others skilled in the art may utilize their teachings.

Figure 1:
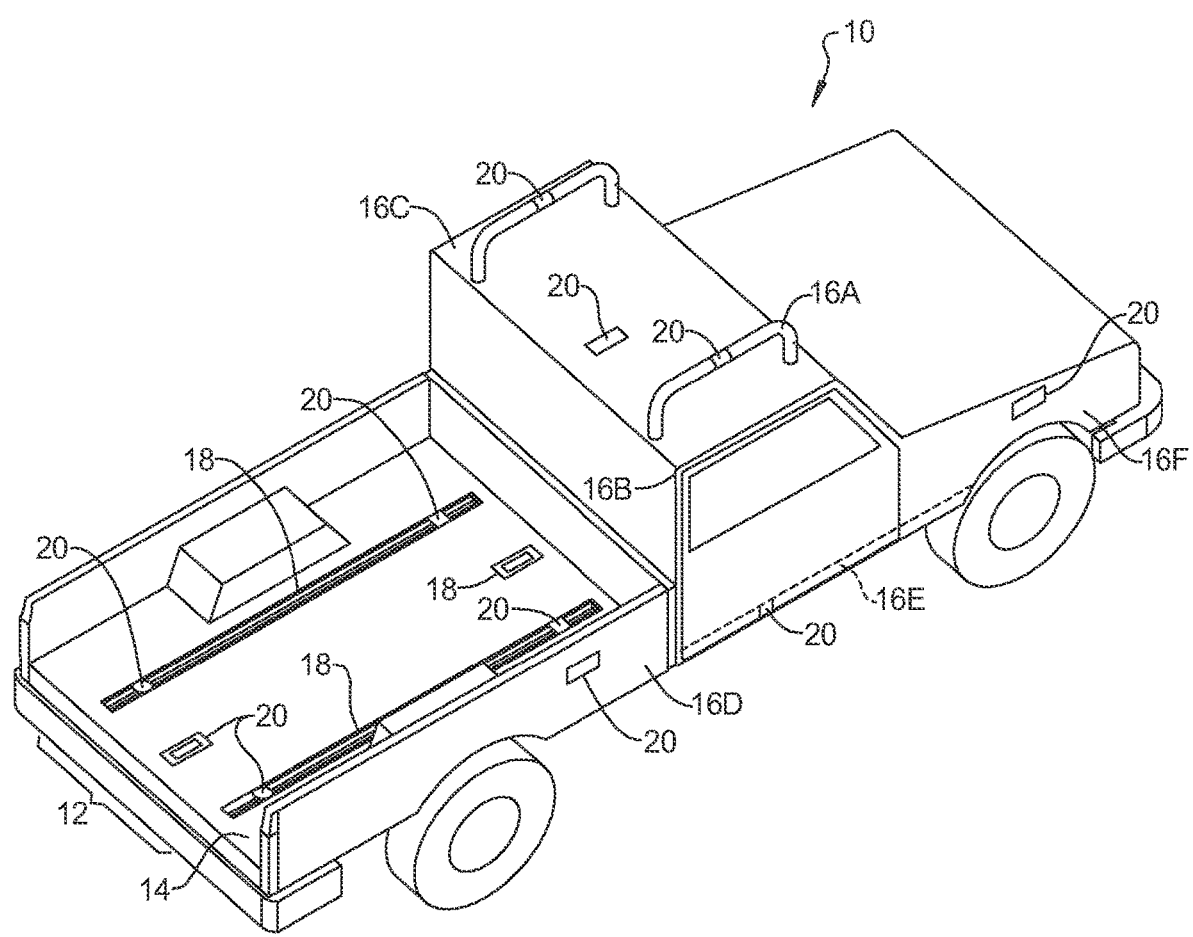
FIG. 1 is a perspective view of a utility vehicle having a retaining system according to the present disclosure.

Referring now to FIG. 1, a vehicle 10 having a retaining system 12 for securing articles (not shown) to a portion of a vehicle 10 such as but not limited to a bed 14. The portion of the vehicle 10 may include but is not limited to a rail, a rack 16A, a roll cage 16B, a roof panel 16C, a side wall 16D, a frame 16E, a body panel 16F, a body structure or the like. As will be further described below, the retainer system 12 may be mounted in various positions of the vehicle 10.

The retainer system 12 may have one or more receivers 18 for receiving a retainer 20. The shapes, orientations and positions of the receivers 18 and retainers 20 may vary, and are further described below. The receivers 18 may be integrally formed with a portion of a vehicle or later added in the aftermarket. One or more retainers 20 of various sizes and shapes may be used together to secure articles.

Referring now to FIG. 2A, one or more receivers 18 may be formed in a rail 22. The rail 22 has an outer wall 24 that at least partially encloses a channel 26. In this example, the outer wall 24 has a top wall 24A, sidewalls 24B, 24C and a bottom wall 24D. One or more of the walls 24A-24D may be a body panel of the vehicle. Of course, the rail 22 may be formed or partially formed as part of one of the vehicle components as described above. The outer wall 24A has a first side 24A1 that is outside of the channel 26 and a second side 24A2 that is within the channel 26. The wall 24A has an elongated opening 30 that, as illustrated, may extend a length such as the length of the rail 22. However, the elongated opening 30 may have shorter portions. The elongated opening 30 of the outer wall 24A has a width $W_1$. The rail 22 may also have a second or locating opening 32. The locating opening 32 may be continuous with the elongated opening 30 and has a second width $W_2$ that is wider than the width $W_1$. The elongated opening 30 and the locating opening 32 together are used to receive and provide a position to secure a retainer 20 as will be further described below. In this example, the locating opening 32 is a potential position for a retainer 20. The number of locating openings 32 may vary depending upon the application and type of retainer. In this example, the locating openings 32 have a first side 34A and a second side 34B that are parallel to the elongated opening 30. Angled sides 36A, 36B, 36C and 36D may be disposed at various angles relative to the first side 34A and the second side 34B. In this example, the angled sides 34A-D are at 45° relative to the first and second sides 34A, 34B. As mentioned above, the sides 34A, 34B, 36A-36D may be differently spaced depending upon the design and the shape of the receiver.

Referring now to FIG. 2B, a bracket 40 having a pair of elongated openings 30A, 30B that are perpendicularly disposed are set forth. Locating opening 32 includes the angled sides 36A-36D, however, the sides 34A, 34B illustrated in FIG. 2A are removed. The elongated openings 30A, 30B allow a retainer 20 to be located in one of four different orientations illustrated by the two end portions of both of the elongated openings 30A and 30B extending from the locating opening 32. This is described in more detail below. The bracket 40 has a pair of flanges 42 with mounting openings 44 extending therethrough. The mounting openings 44 may be used to receive a fastener, for example, a screw for fastening the bracket 40 to components of a vehicle or to a wall.

The bracket 40 has an upper wall 46 that have the elongated openings 30A, 30B and the locating opening 32 therein. Of course, the upper wall 46 may be extended to provide more than one set of elongated openings 30A, 30B and locating openings 32. The bracket 40 is illustrated with one set of elongated openings 30A, 30B and locating opening 32. Multiple sets may be provided should the size of the bracket be enlarged.

Figure 2C:
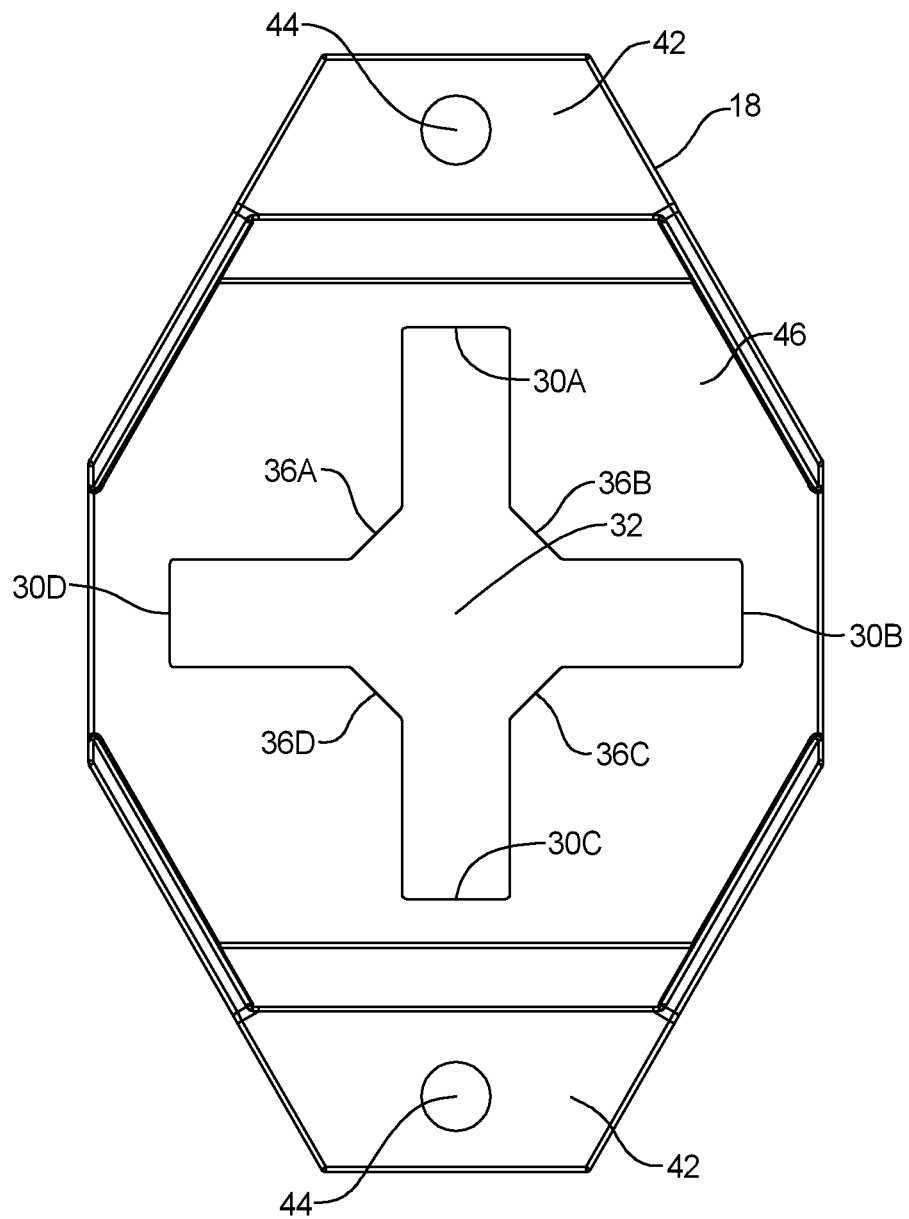
FIG. 2C is a front view of a receiver being a bracket.

Referring now to FIG. 2C, a plurality of brackets 40 may be spaced apart on a wall 48 or a panel. The wall 48 may be a wall of a garage, for example, so that the articles may be stored therein when not in use on the vehicle. If the wall 48 is a body panel or side panel of a vehicle, articles may be carried by the vehicle using retainers 20 coupled thereto. The elongated openings 30A, 30B and the locating openings 32 may be configured as described above relative to FIG. 2B.

Figure 2D:
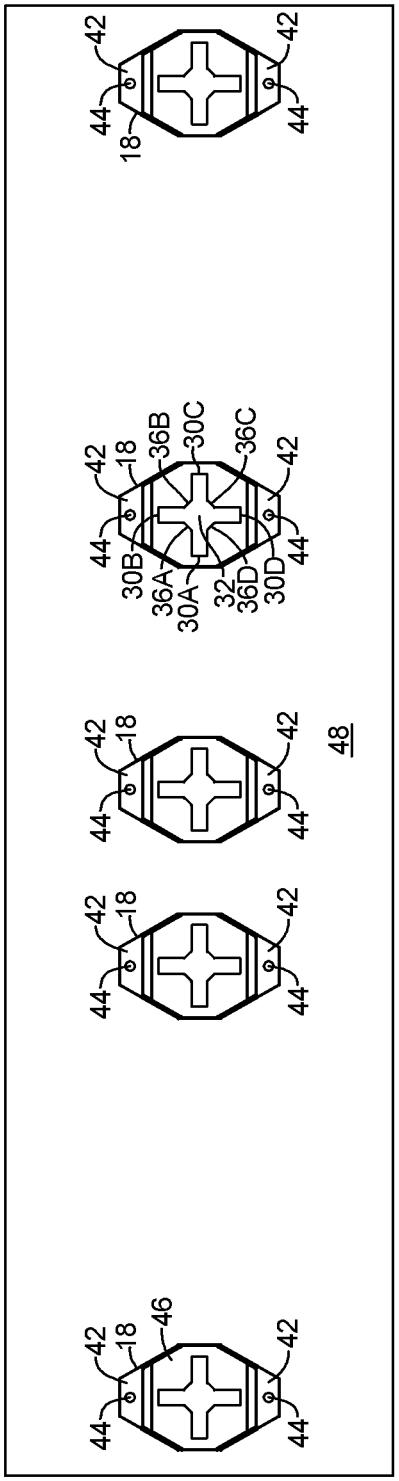
FIG. 2D is a front view of receivers disposed spaced apart.
Figure 2E:
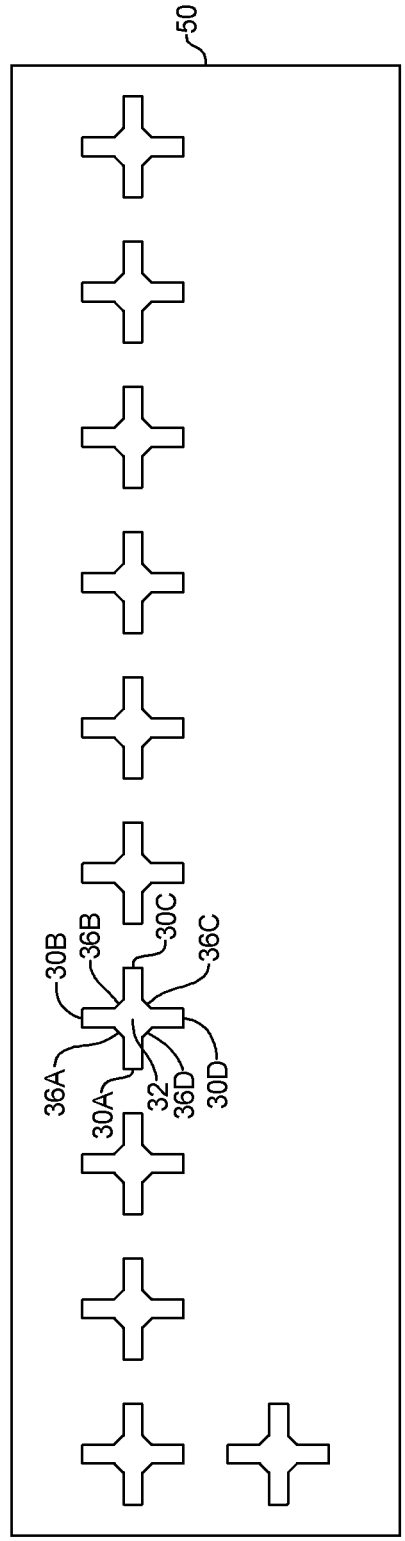
FIG. 2E is a sheet material having a plurality of openings for receiving a retainer.

Referring now to FIG. 2D, a mounting board 50 may have a plurality of elongated openings 30A, 30B and locating openings 32 formed as set forth in FIG. 2B. The mounting board 50 may be used in a vehicle location such as a sidewall or floor of a utility vehicle bed. The mounting board 50 may be formed of but not limited to metal, wood or composite material. The mounting board 50 may be used in a home or shop, for example, in a garage or basement to store various articles with one or more of the retainers described below.

Figure 3A:
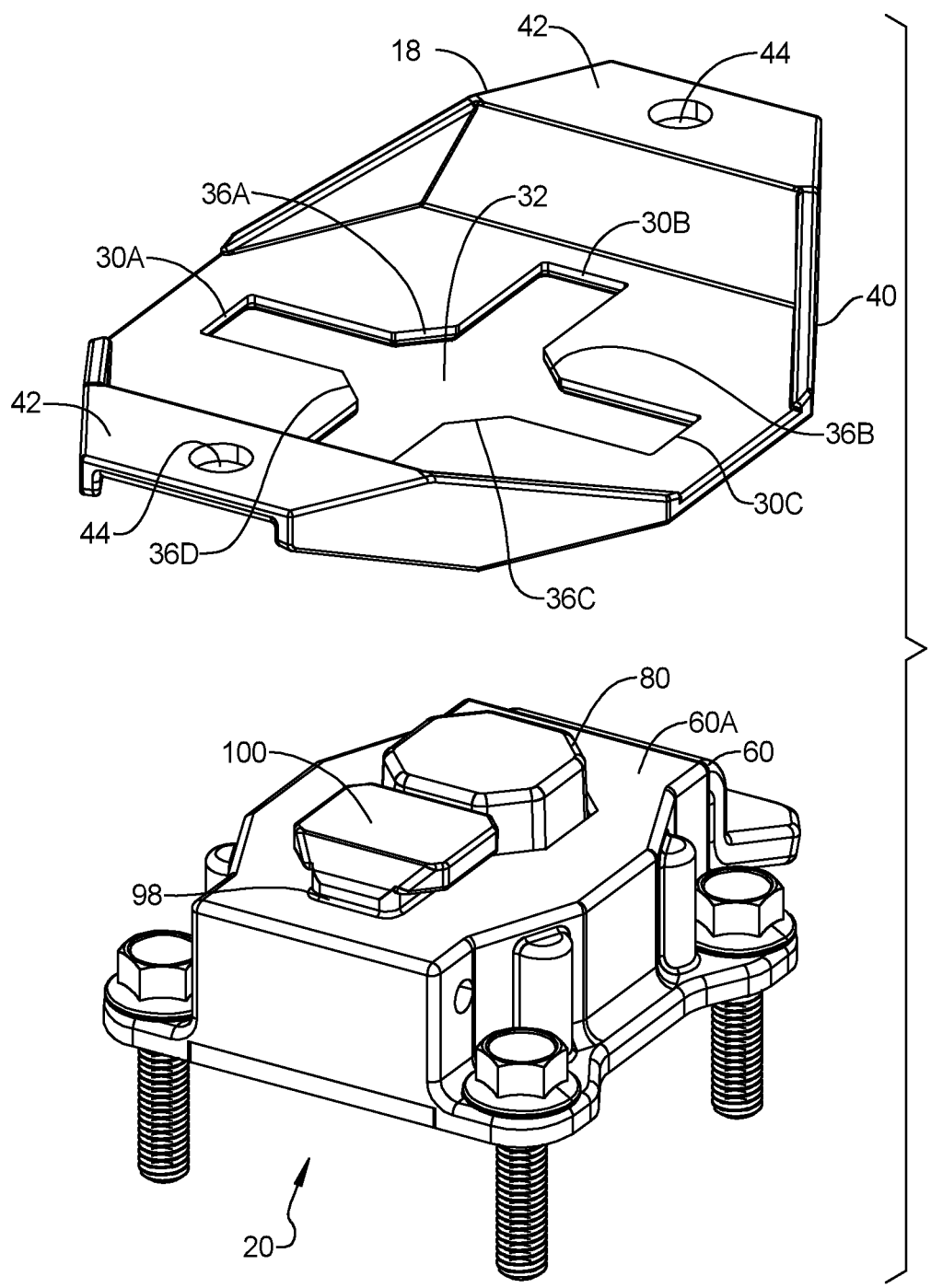
FIG. 3A is a perspective view of a first example of a retainer relative to a bracket.
Figure 3B:
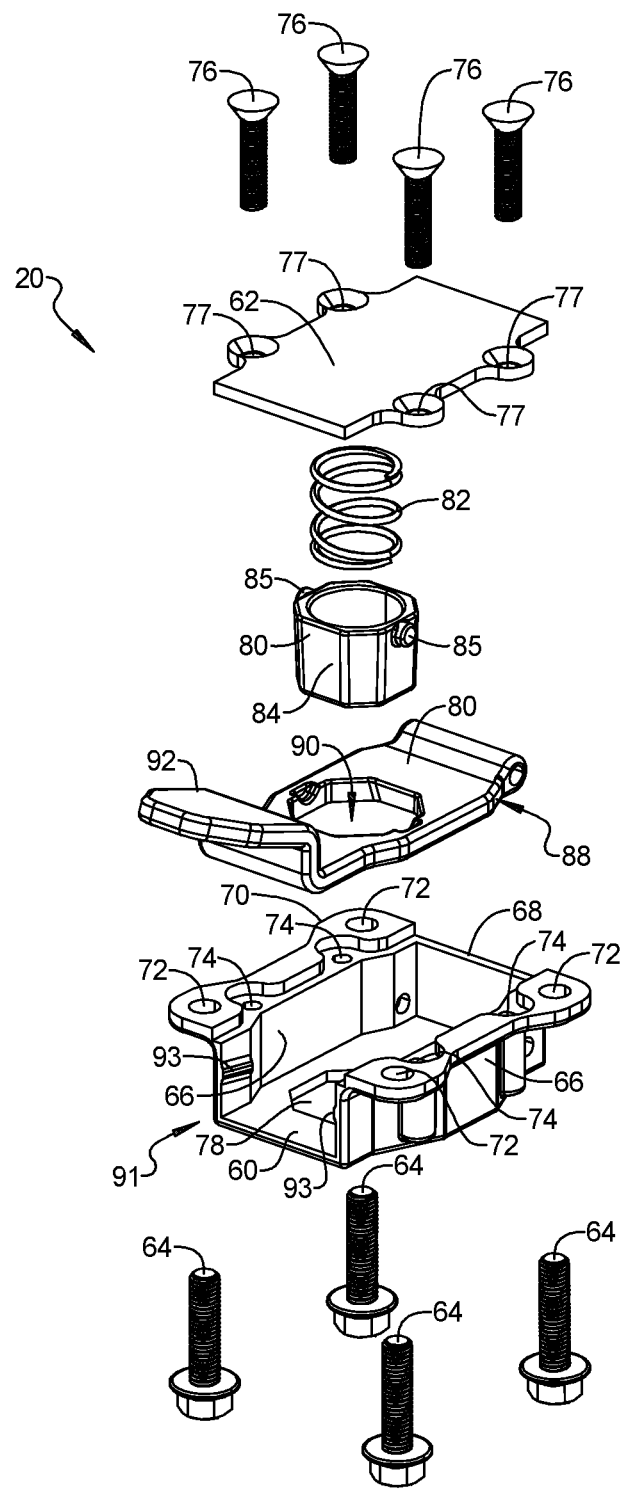
FIG. 3B is an exploded view of the retainer of FIG. 3A.
Figure 3C:
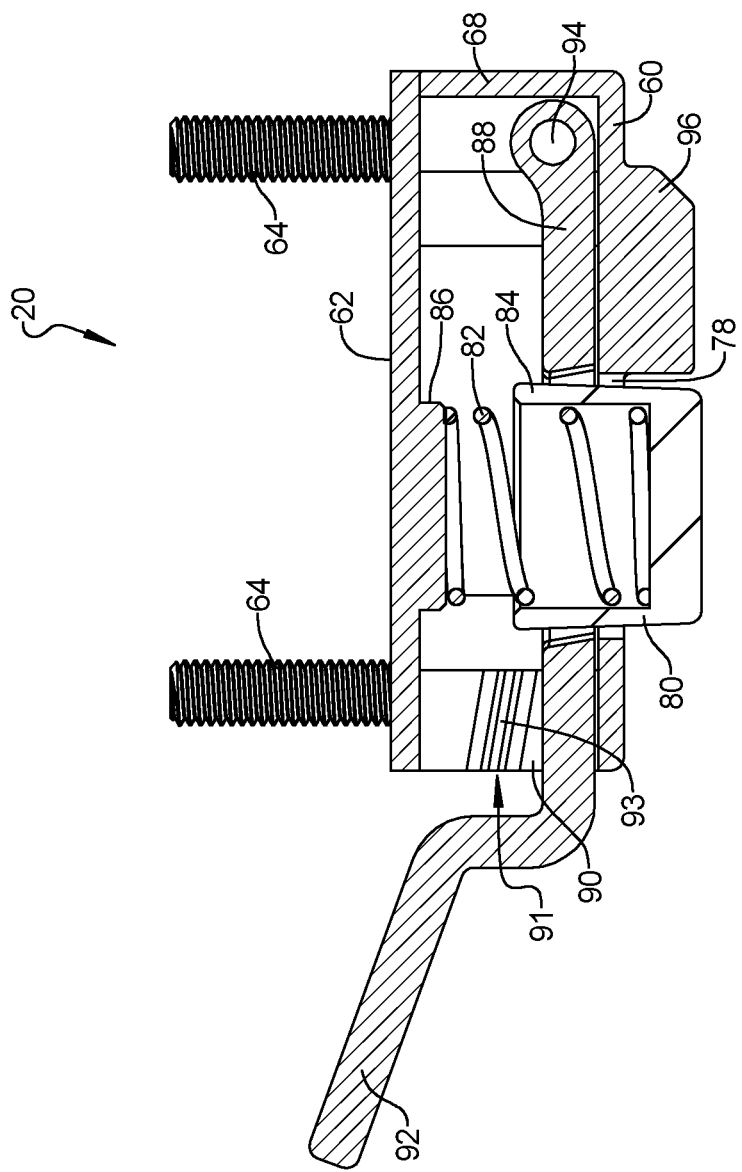
FIG. 3C is a cross-sectional view of the retainer of FIG. 3A.

Referring now to FIGS. 3A-3C, the retainer 20 is illustrated in further detail. The retainer 20 includes a base 60. The base 60 has a first side 60A and a second side 60B that is disposed within the retainer 20. The base 60 is coupled to a cover 62. The cover 62 may be coupled to the base 60 with a plurality of fasteners 64. In this example, the base 60 has sidewalls 66 and an end wall 68. Of course, the sidewalls 66 and the end wall 68 may be formed as part of the cover 62. Flanges 70 extend from the sidewalls 66 and receive the fasteners 64 in openings 72.

The flanges 70 may also comprise openings 74. The openings 74 may receive fasteners 76 used to secure the cover 62 to the flanges 70 through openings 77 in cover 62.

The base 60 has a base opening 78 therethrough. The base opening 78 is sized to receive a plunger 80 having side walls 84. The plunger 84 is urged through the base opening 78 with a spring 82. A spring retainer 86 formed as part of the cover 62 may be used for locating the spring 82 relative to the plunger 80.

A lever member 88 has a lever opening 90 and a handle 92. The handle 92 extends outward from the retainer 20 through an end 91 opposite the end wall 68.

Retainers 93 extend inward laterally from the end 91 may be used to retain the lever member 88 in an upward position during operation. A downward force by the operator can overcome the force provided by the retainers 93.

A pin 94 rotatably mounts the lever member 88 to the sidewalls 66. Flanges 85 illustrated in FIG. 3B cooperate with the lever member 88 so that when the lever member 88 is lifted or moved toward the cover 62, the plunger 80 is withdrawn from the locating opening 32 and also moved toward the cover 62. The plunger 80 is sized and shaped to fit within the locating opening 32 and is urged into the locating opening by the spring 82.

A first side 60A of the base 60 includes an engagement member 96 coupled thereto or formed therewith. The engagement member 96 includes a first portion 98 that has a width slightly less than the width W1 of the elongated opening 30. A second portion 100 extends from the first portion 98 and has width wider than the elongated opening 30 but is sized to be received within the locating opening 32. The thickness of wall 24A, illustrated best in FIG. 2A, fits between the second portion 100 and the first side 60A of the base 60. That is, the height of the first portion 98 is at least slightly greater than the thickness of the wall 24A so that the wall 24A is received between the second portion 100 and the first side 60A. This prevents the retainer 20 from substantially moving laterally within the elongated opening 30.

Figure 3D:
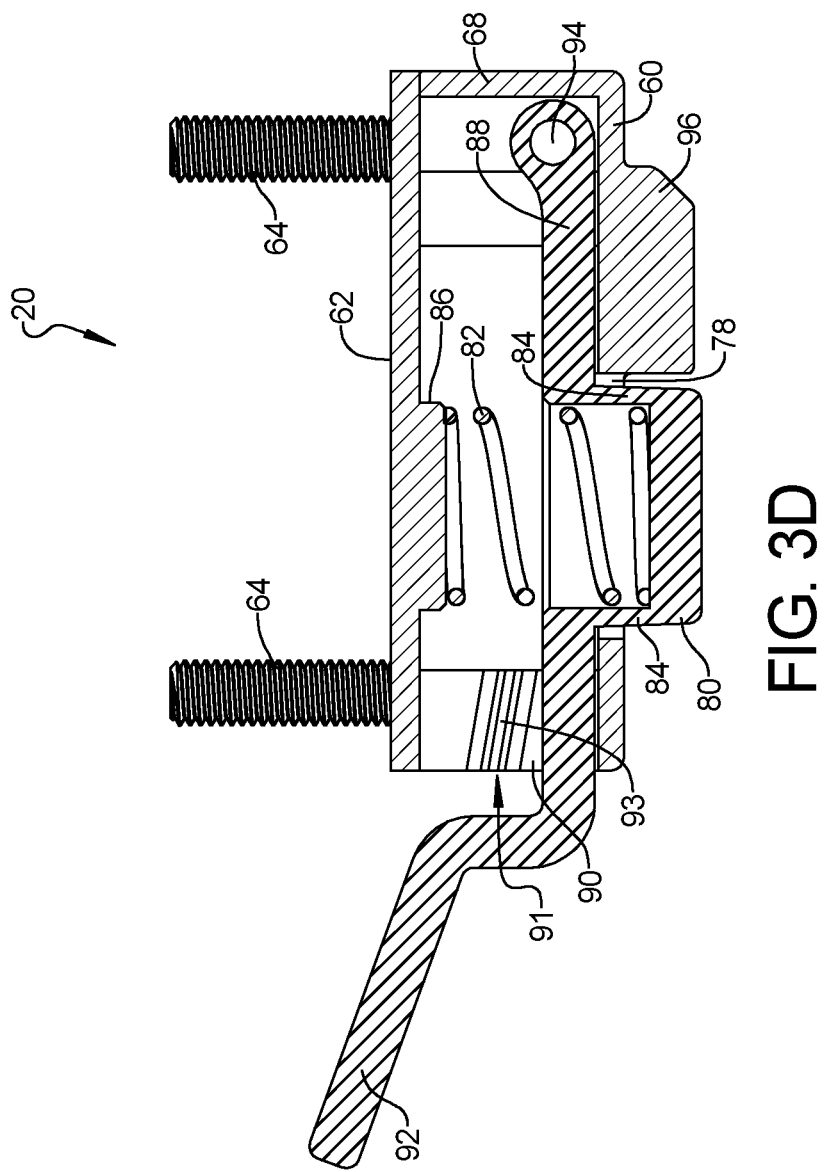
FIG. 3D is a cross-sectional view of a lever member having an integral plunger.

Referring now to FIG. 3D, the plunger 80 is integrally formed with the lever member 88. The lever member 88 thus moves together with the plunger 80 during operation. In the examples of FIGS. 3A-C, the plunger 80 could move separately from the lever arm 88.

FIGS. 4A-4I the steps of coupling of the retainer 20 to the bracket 40 are illustrated.

Figure 4A:
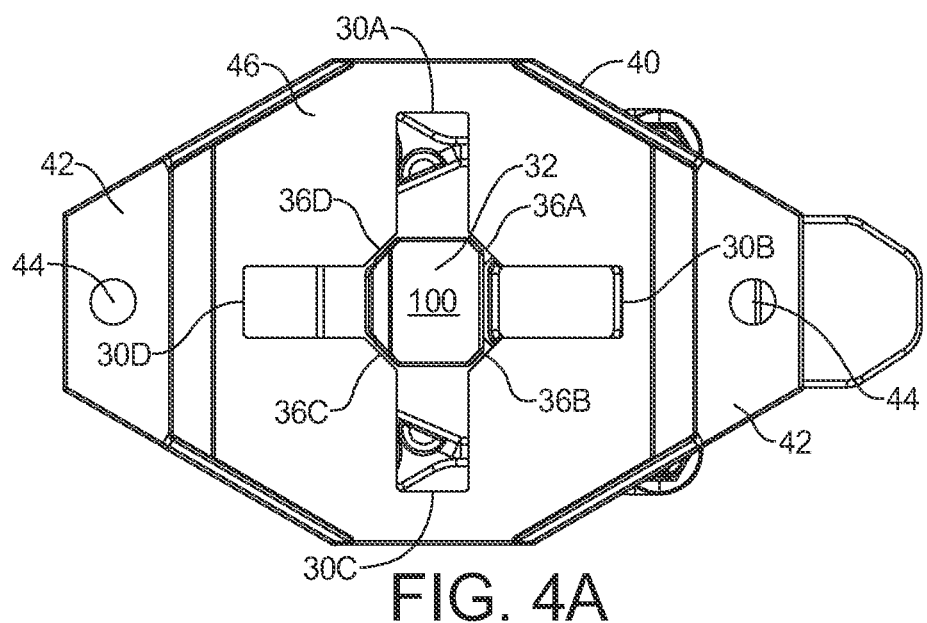
FIG. 4A shows a bracket and a retainer from the underside in a partially aligned position.
Figure 4B:
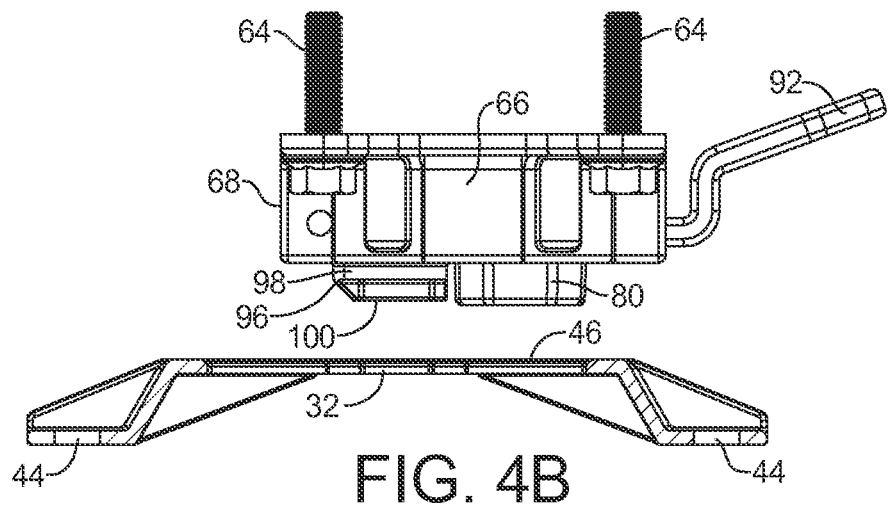
FIG. 4B is a side view of the retainer of FIG. 4A.

Referring specifically now to FIGS. 4A and 4B, to position the retainer 20 at the elongated openings 30A, 30B, and the locating opening 32, the retainer 20 is positioned adjacent to the upper wall 46 of the 40 bracket thereto.

Figure 4C:
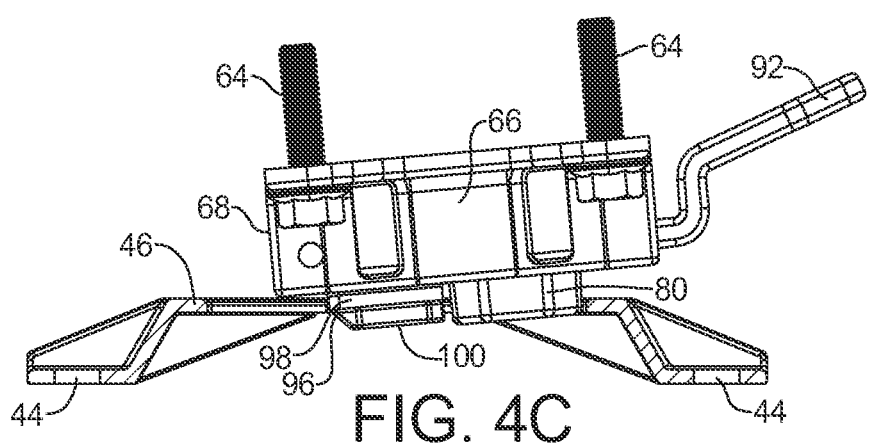
FIG. 4C is a side perspective view of the retainer of FIG. 4A being partially inserted.
Figure 4D:
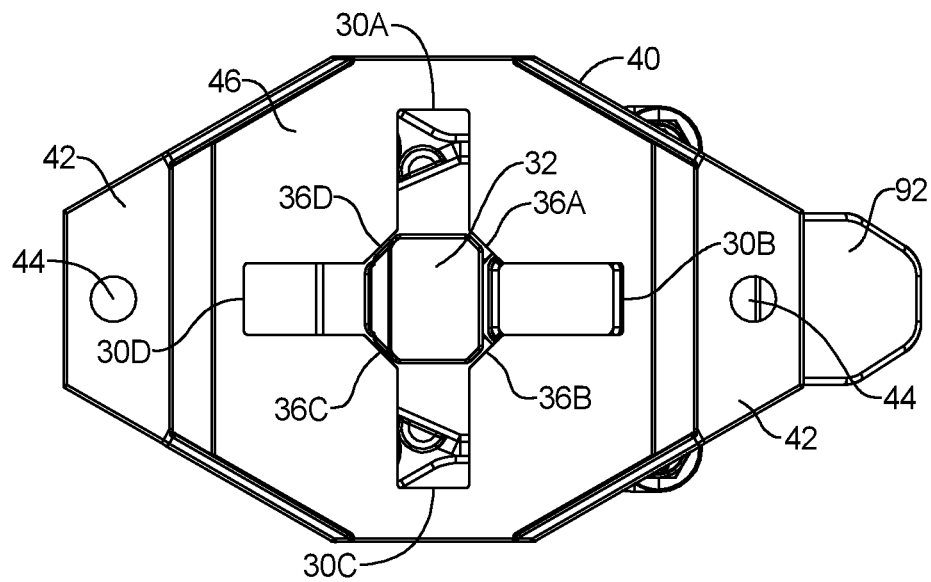
FIG. 4D is a bottom view of the retainer relative to a bracket with the engagement member aligned.
Figure 4E:
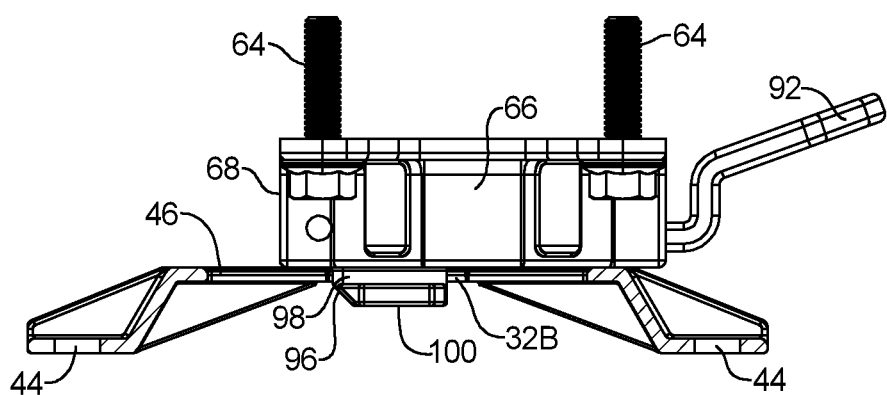
FIG. 4E is a side view of the retainer and bracket of FIG. 4E.
Figure 4F:
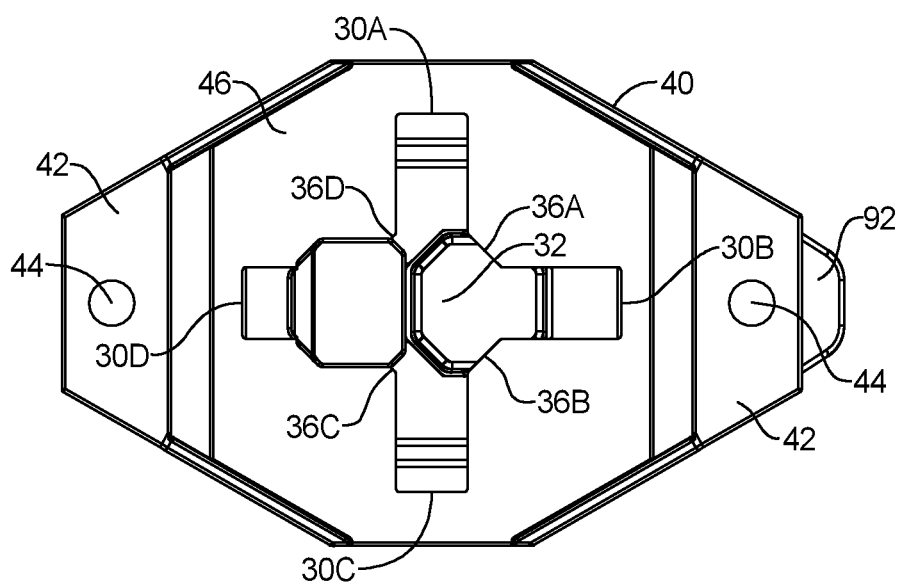
FIG. 4F is bottom view of the retainer of FIG. 4A nearly fully inserted.

Referring now to FIG. 4C, the plunger 80 is partially retracted by contacting the upper wall 46 of the bracket 40. The engagement member 96 and, in particular, the second portion 100 of the engagement member 96 is received within the locating opening 32. Partial insertion is illustrated in FIG. 4C. Full insertion is illustrated in FIGS. 4D and 4E. In particular, in FIGS. 4D and 4E, the plunger 80 is fully retracted and the first side 60A of the base 60 is touching the upper wall 46 of the bracket 40. In FIG. 4F, the retainer 20 is slid to more fully engage one of the elongated openings 30A, 30B while the plunger 80 remains fully retracted.

Figure 4G:
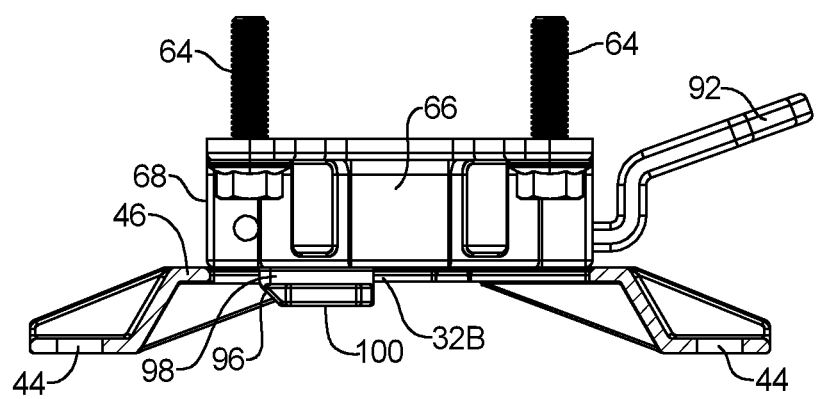
FIG. 4G is a side perspective view of the retainer of FIG. 4F.
Figure 4H:
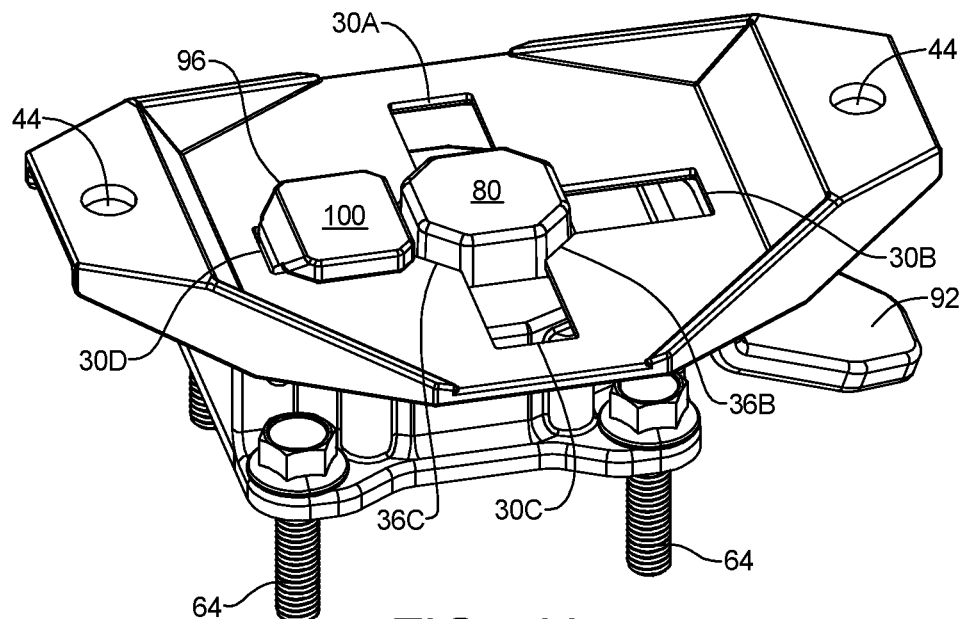
FIG. 4H is a perspective view illustrating the retainer of FIG. 4A fully inserted within the elongated opening and the locating opening.

Referring now to FIGS. 4F, 4G and 4H, the engagement member 96 is becoming fully inserted within the elongated opening 30 and thus the plunger 80 is aligned with the locating opening 32 and extends therein. The locating opening 32 is just larger than the plunger 80 and therefore the retainer 20 is secured into position.

To retract the plunger 80, the lever member 88, through action by the operator, moves the handle 92 and the lever member 88 away from the base 60 toward the cover 62. The flanges 85 catch on the lever member 88 just outside of the lever opening 90 to raise the plunger 80 at least partially within the space between the cover 62 and the base 60. This allows the engagement member 96 to disengage and slide toward the locating opening 32 where the retainer 20 can be fully removed from the bracket 40.

Figure 4I:
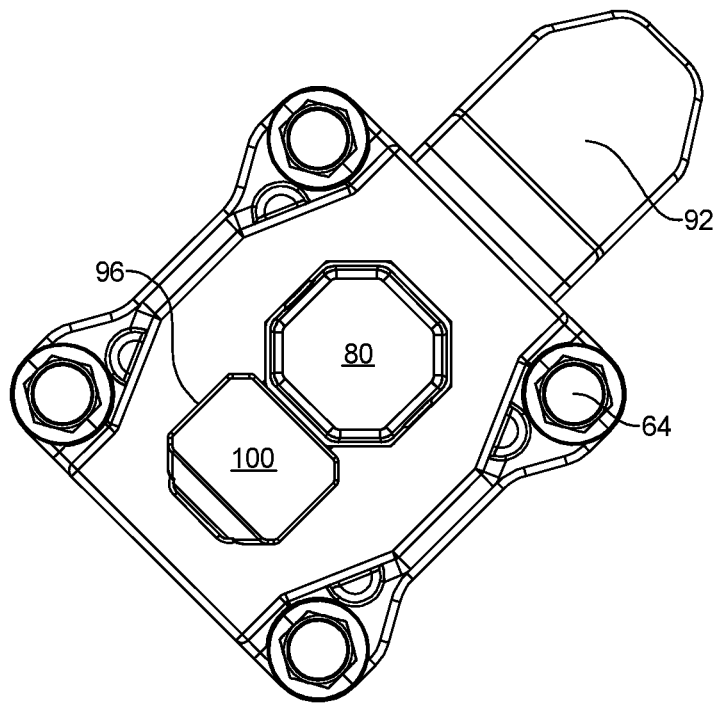
FIG. 4I is a bottom view of a retainer that can be oriented in different orientations.

Referring now to FIG. 4I, a slightly modified retainer 20 is illustrated. In this example, the fasteners 64 are disposed in a circle that has a center C at the plunger 80. The plunger 80 has sidewalls 84' that are shaped into an octagon. The walls 84' allow the retainer to be retained in various orientations within the elongated opening 30A-30D and the locating opening 32.

Figure 5A:
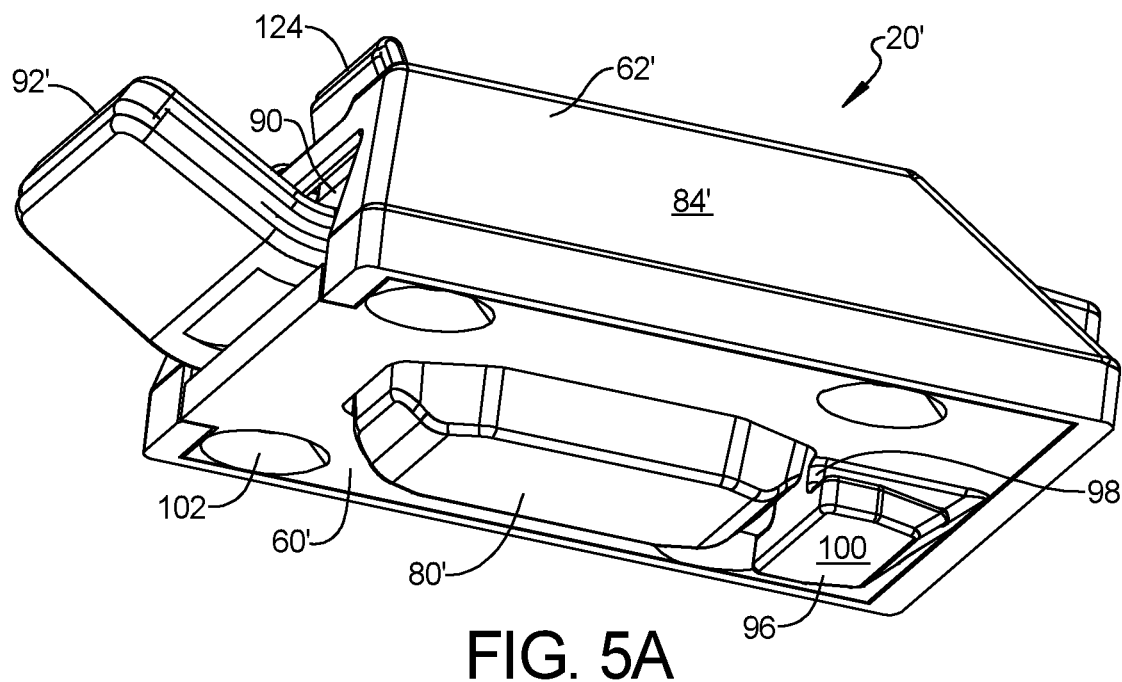
FIG. 5A is a bottom perspective view of a second example of a retainer.
Figure 5B:
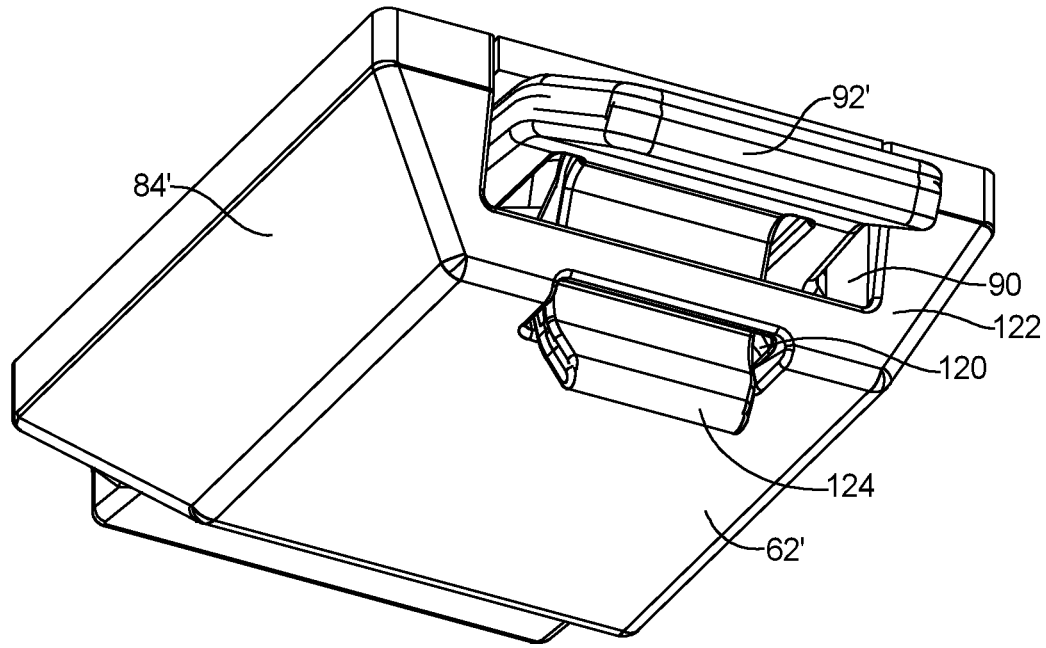
FIG. 5B is a top perspective view of the retainer of FIG. 5A.
Figure 5C:
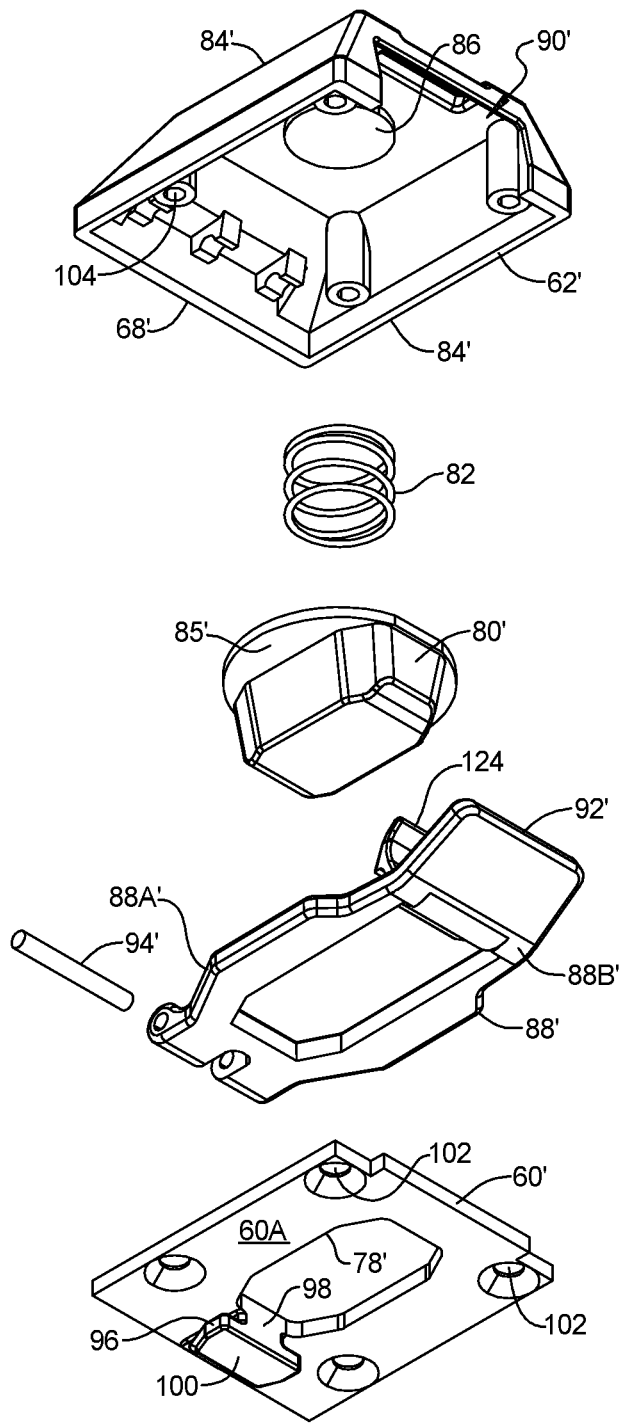
FIG. 5C is a bottom exploded view of the retainer of FIG. 5A.
Figure 5D:
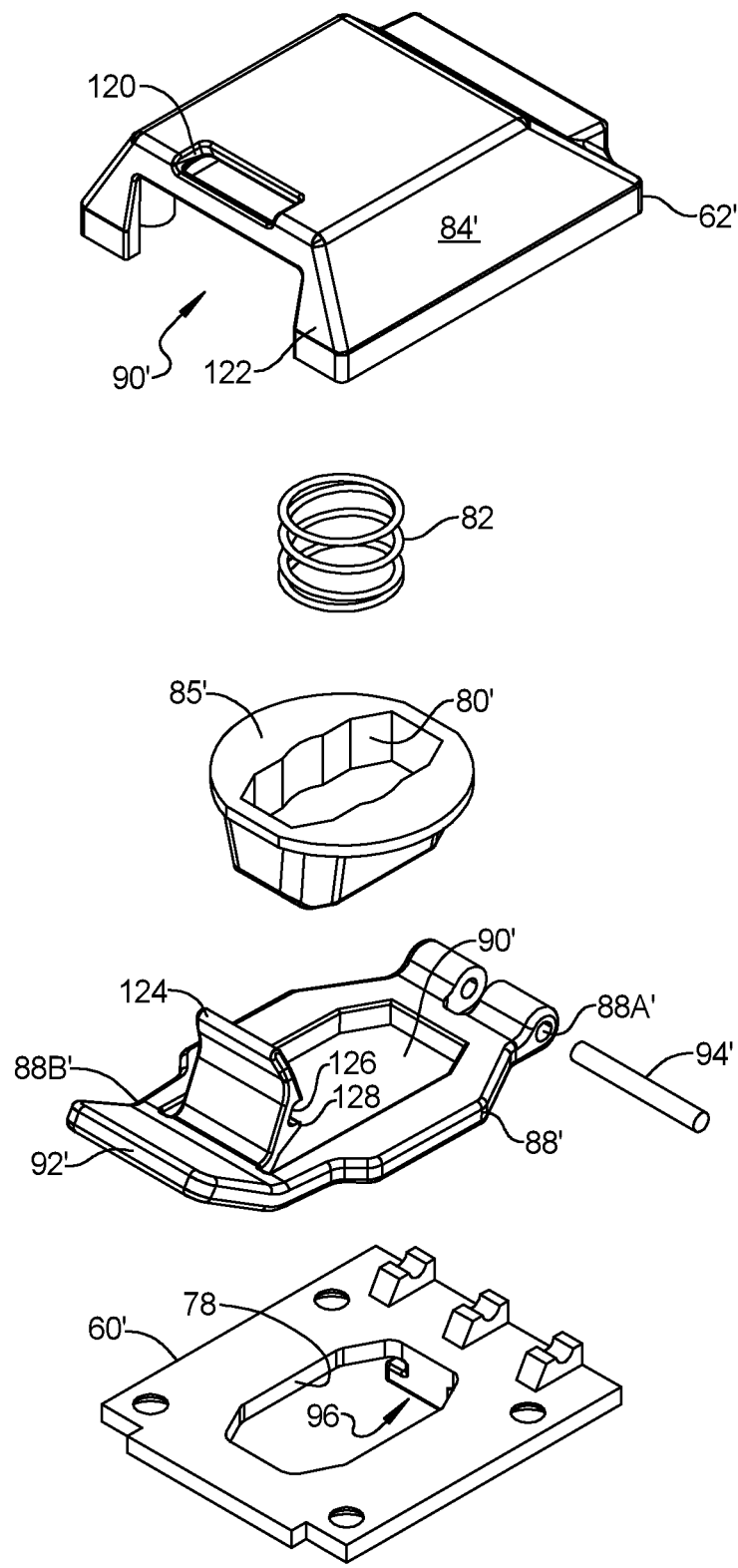
FIG. 5D is an exploded top retainer view of the retainer of FIG. 5A.

Referring now to FIGS. 5A-5F, a second example of a retainer 20' is set forth. In this example, a base 60' and cover 62' are illustrated with geometric modifications to the base 60 and cover 62 above. In this example, sidewalls 84' are integrally formed with the cover 62' and the end wall 68' is integrally formed with the cover 62' as well. Fasteners (not shown) are used to couple the base 60' to the cover 62' through respective openings 102 and 104. Also, in this example, the flanges 85 extend further from the plunger 80 laterally. As is best shown in FIG. 5D, the cover 62' may have a second cover opening 120 disposed within the cover 62'. The second cover opening 120 may also extend partially into a second end wall 122 that is disposed at the handle end of the cover 62'.

The lever member 88' has a first end 88A' and a second end 88B'. The second end 88B' has a catch extension 124 extending therefrom. The catch extension 124 extends outward from the lever member 88' away from the base 60' toward the cover 62'. The catch extension 124 has a receiving portion 126 that has a dimension to receive the thickness of the cover when the lever member 88' is in the uppermost position as illustrated best in FIG. 5F.

The lever member 88' has an opening 90' to receive the plunger 80'.

Figure 5E:
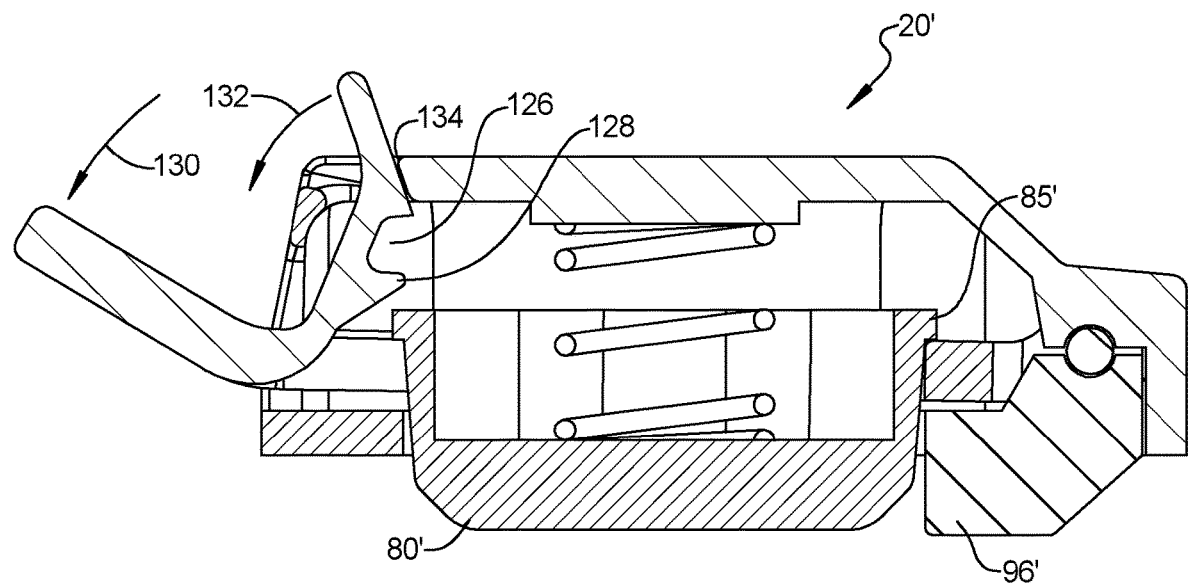
FIG. 5E is a side cross-sectional view of the retainer of FIG. 5A.
Figure 5F:
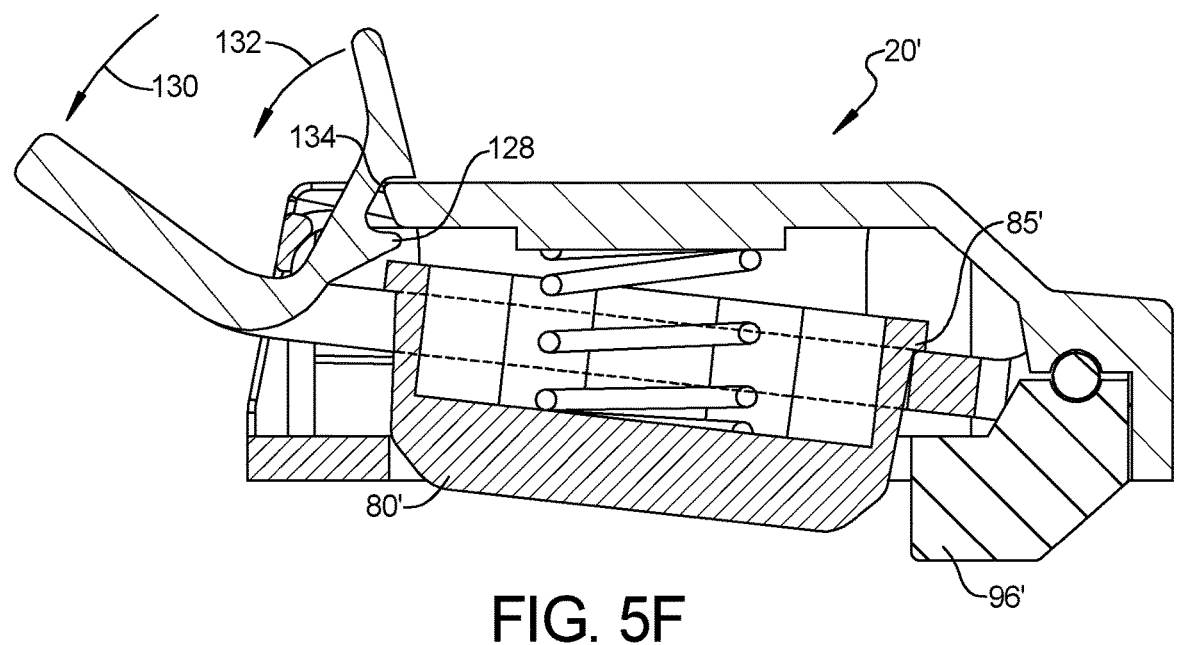
FIG. 5F is a cross-sectional view of the retainer of FIG. 5A with the lever member in a second position.

The operation of the retainer 20' is similar to that described above with the addition of the operation of the catch extension 124, the receiving portion 126 and a ramp portion 128. The ramp portion 128 is positioned between the receiving portion 126 and the lever member 88'. To insert the retainer 20', the engagement member 96 is first aligned with the locating opening 32. While the engagement member 96 is sliding into the elongated opening 30, the plunger 80' is partially retracted until the plunger 80' aligns with the locating opening 32 and the plunger 80' is urged into place with the outward spring force from spring 82. The inserted position is illustrated in FIG. 5E. To allow removal of the retainer 20', the operator pushes in an outward or downward direction illustrated by arrow 130 on the handle 92. The edge 134 of the cover 62 forces the catch extension 124 outward and thus the receiving portion 126 is able to fit an edge 134 of the cover 62'. The lever member 88' during this process lifts the plunger 80' by way of the flanges 85' so that plunger 80 is at least partially withdrawn from the locating opening 32.

To place the retainer 20' into the locating opening 32, the engagement member 96 is placed into the locating opening 32 and slid toward the locating opening, this pushes the ramp portion 128 outward using the edge of the plunger 80. The force outward as indicated by arrow 132 allows the disengagement of the receiving portion 126 from the edge 134 of the cover 62. As the plunger 80 aligns with the locating opening 32, the plunger 80 extends downward to secure the retainer 20'.

Figure 5G:
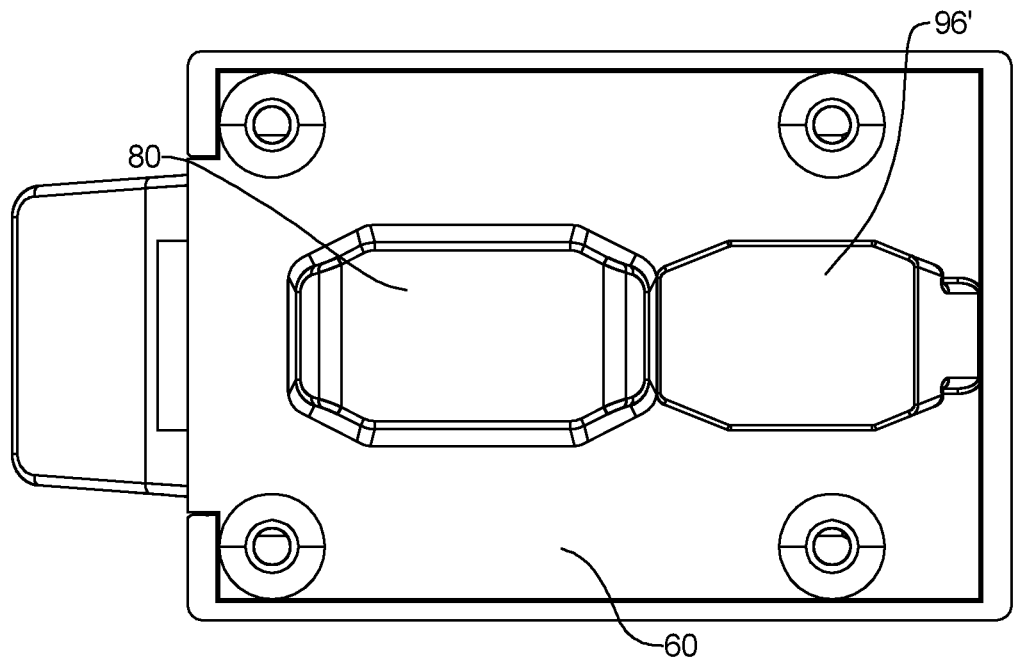
FIG. 5G is a bottom perspective view of an anchor having an alternate base.

Referring now to FIG. 5G, the retainer 20' is illustrated as having an engagement member 96 that is elongated compared to that which is described above. In this example, the overall shape and size of the engagement member 96 is about that of the plunger 80.

Figure 5H:
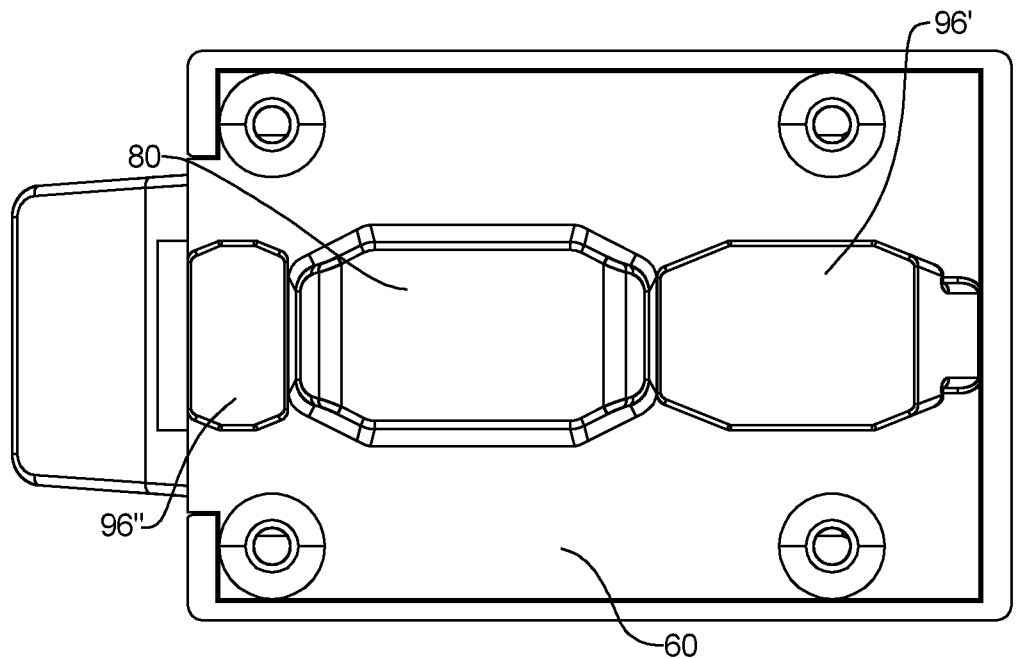
FIG. 5H is another bottom perspective view of an anchor having a different configuration.

Referring now to FIG. 5H, the example set forth in FIG. 5G has been modified with a second fixed engagement member 96". The engagement member 96" is similar in size to that described above, however, the engagement member 96' and the engagement member 96" are on opposite ends laterally of the plunger 80.

Figure 6A:
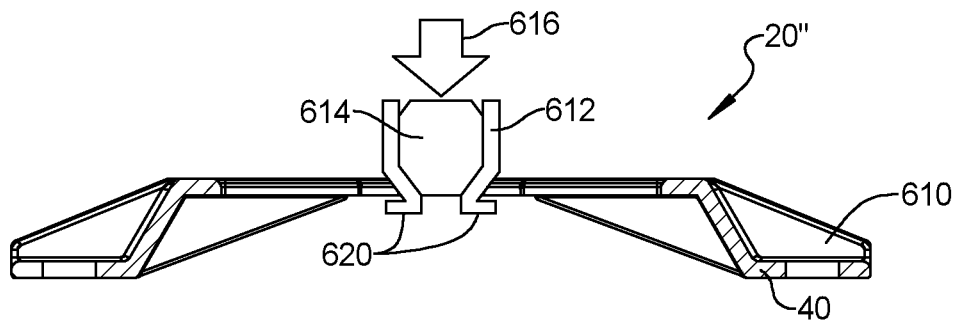
FIG. 6A is a side cutaway view of a push button retainer in the closed position.
Figure 6B:
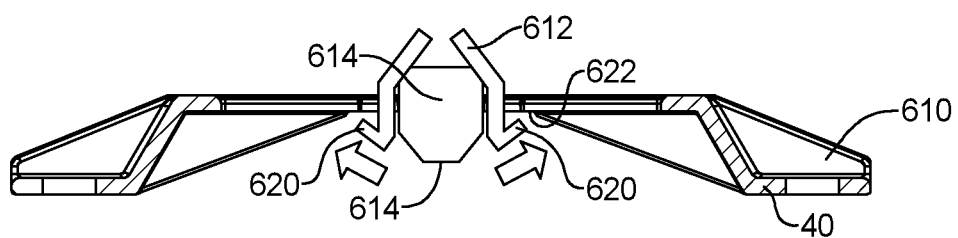
FIG. 6B is the retainer of FIG. 6A in the open position.
Figure 6C:
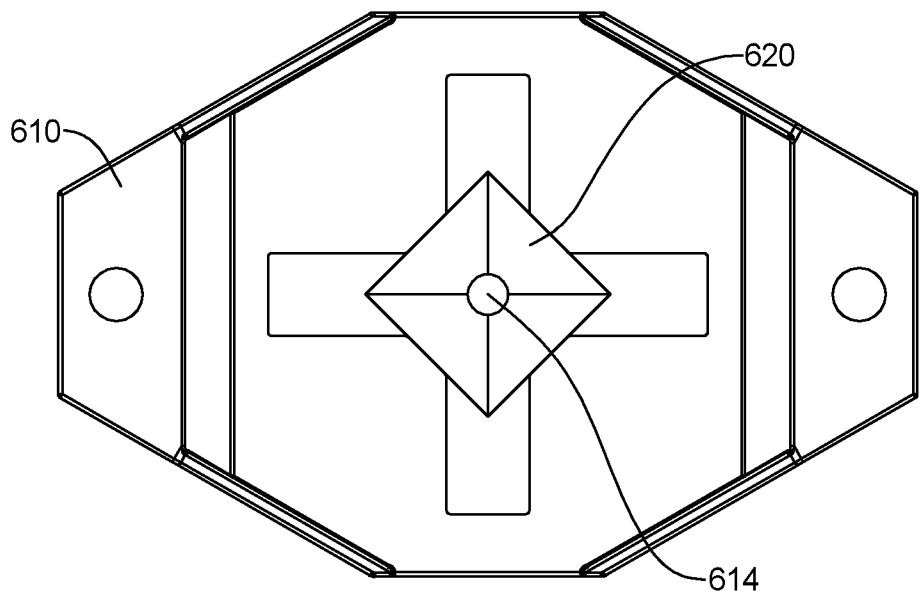
FIG. 6C is a bottom view of the plunger illustrated in FIG. 6A.
Figure 6D:
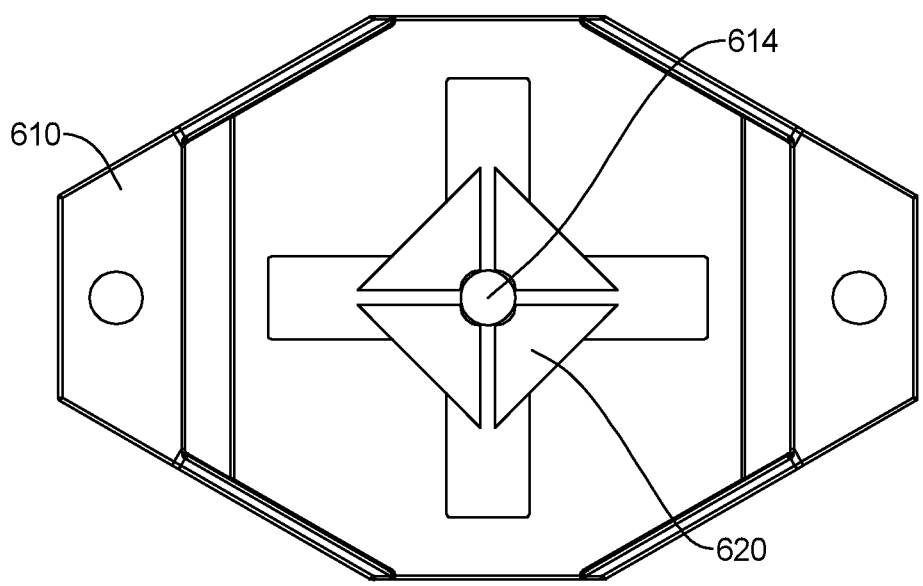
FIG. 6D is a bottom view of the expanded plunger of FIG. 6B.

Referring now to FIGS. 6A-6D, the bracket 40 is illustrated with an alternate coupling system. Rather than the plunger 80, as illustrated above, a more permanent solution (meaning that is less likely that the operator removes and replaces often) is set forth. A base of a retainer 20" is illustrated. The retainer 610 comprises a pair of grippers 612 and a plunger 614. As illustrated in contrast to FIGS. 6A and 6B, as the plunger is moved in a downward position as indicated by the arrow 616, the grippers 612 extend outward. Catches 620 extend outward and cooperate with the underside of the base 610. FIGS. 6C and 6D show the underside of the bracket 40. The catches 620 are illustrated in a non-extended position and an extended position, respectively.

Referring now to FIGS. 7A-7E, a retainer 20" is illustrated. The retainer 20" has a base 710 and a rotating member 712 that rotates relative to the base 710. The rotating member 712 has a handle 714, a planar ring 716 and spring extensions 718 that extend outward from the planar ring 716. The spring extensions 718 are received within pockets 720 of a spring 722. As will be described in greater detail, the diameter D1 is changed as the handle 714 is used to rotate the spring extensions 718 to engage and disengage a button 724. More particularly, the spring 722 engages a circumferential groove 726 of the button 724. Movement of the spring 722 engages and disengages the circumferential groove 726 to prevent and allow axial movement of the button 724. A housing 728 is coupled to the base 710 to enclose the rotating member 712 therein except for the handle 714. The handle 714 extends from the handle opening 730 of the housing 728.

The button 724 is received within the housing opening 732. The button 724 may be attached to various types of articles or electrical devices as will be described in more detail below.

Flanges 734 extend from the housing 728 to allow the retainer 20" to be mounted to a surface.

The spring 722 has spring ends 736 that are received within spring retainer 738. That is, from the inside of the housing 728, the spring ends 736 extend upward to be fixedly attached to the housing 728.

Figure 7A:
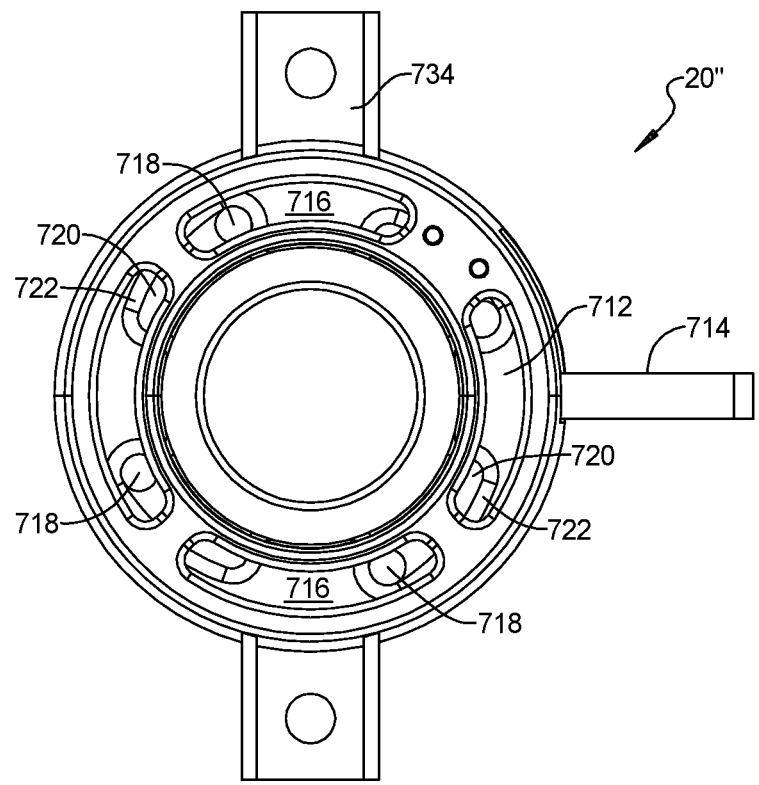
FIG. 7A is a top view of a third example of a retainer.
Figure 7B:
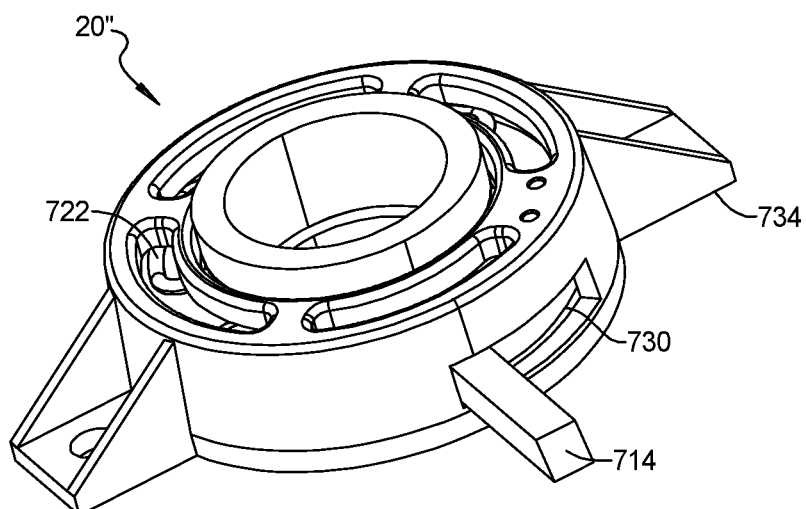
FIG. 7B is a perspective view of the third example of the retainer.
Figure 7C:
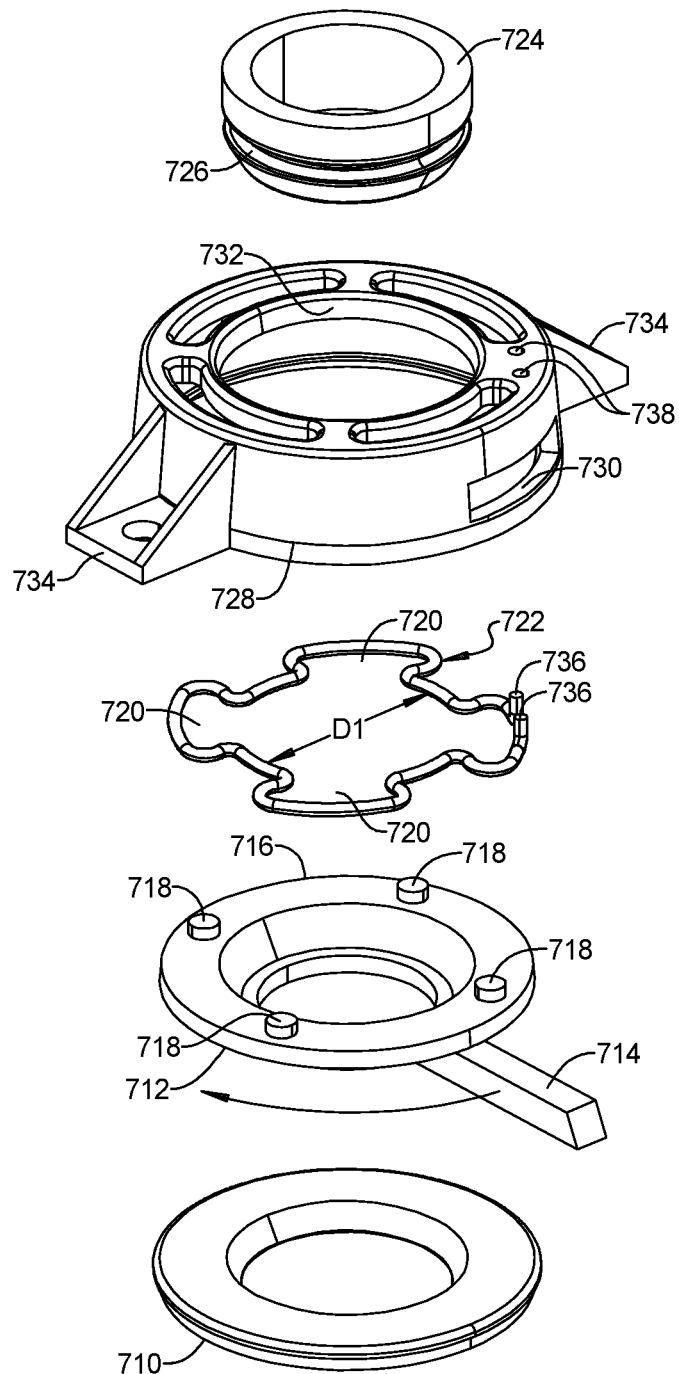
FIG. 7C is an exploded view of the retainer of FIG. 7A.
Figure 7D:
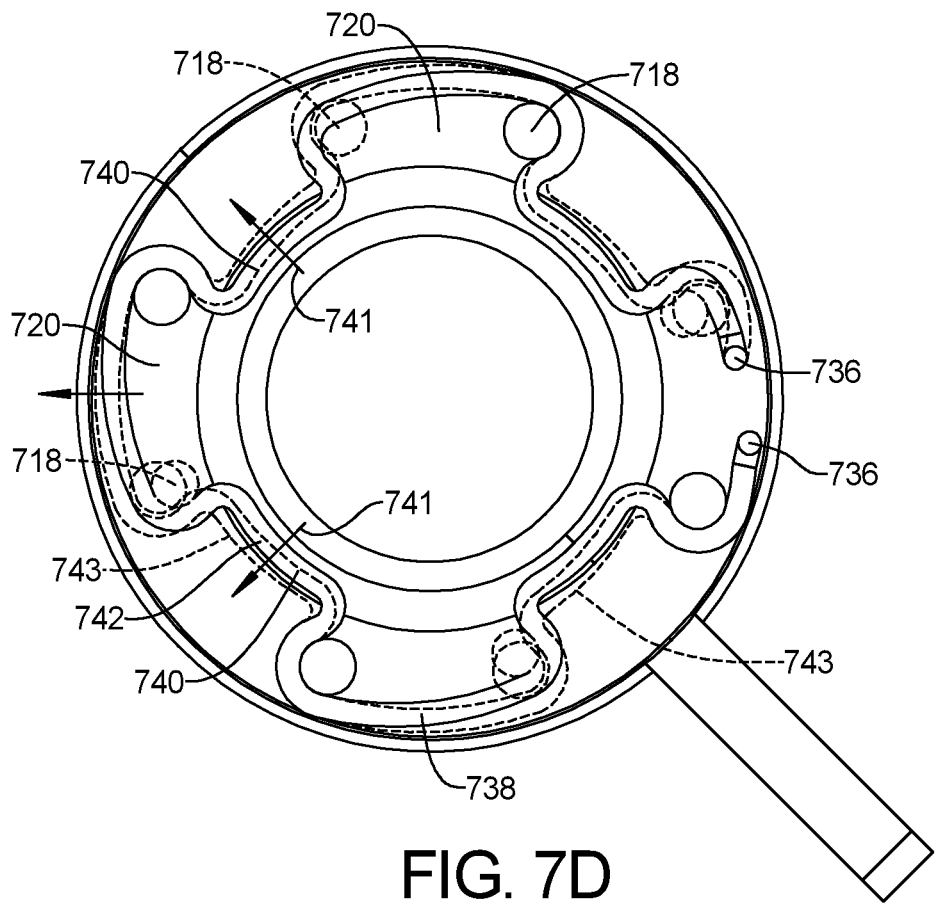
FIG. 7D is a cutaway view of the spring and rotating member of FIG. 7A.

Referring now to FIG. 7D specifically, the rotating member 712 rotates the planar ring 716 and the spring extensions 718 extending therefrom. The two different positions of the spring extensions 718 are illustrated. The spring pockets 720 expand outwardly when the spring extensions 718 move in a counterclockwise direction. As can be seen in FIG. 7D, the spring segment 740 is not straight but rather is at an angle relative to the edge of the planar ring 716. As the spring extensions rotate in a counterclockwise direction, the spring pockets 720 withdraws and the spring segment 742 moves outward. This allow the spring segments 740 to also move outward as indicated by the arrows 741. This allows the button 724, and in particular the circumferential groove 726, to be disengaged from the spring segment 740. That is, the spring segment 740 is withdrawn from the circumferential groove 726.

Figure 7E:
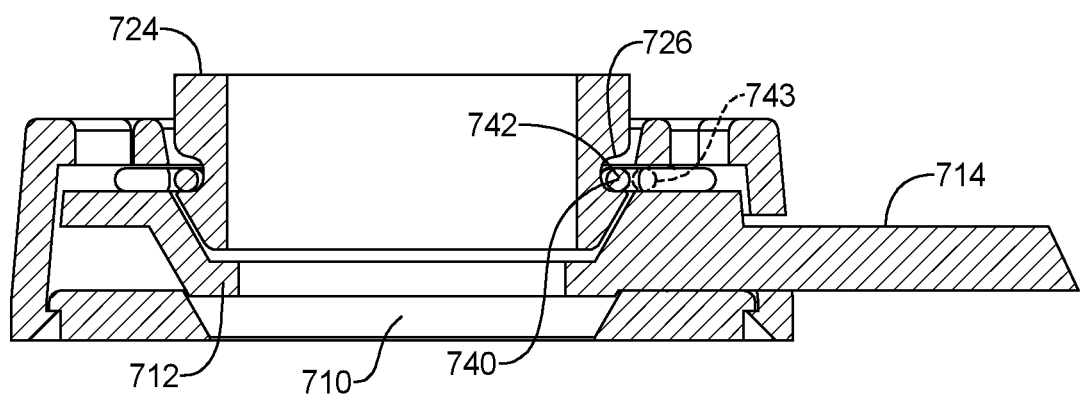
FIG. 7E is a cross-sectional view of the retainer of FIG. 7A.

Referring specifically to FIG. 7E, the circumferential groove 726 and the spring segment 740 are shown engaged.

The spring segment 740 is also shown in a disengaged position 743 relative to the circumferential groove 726.

Figure 7F:
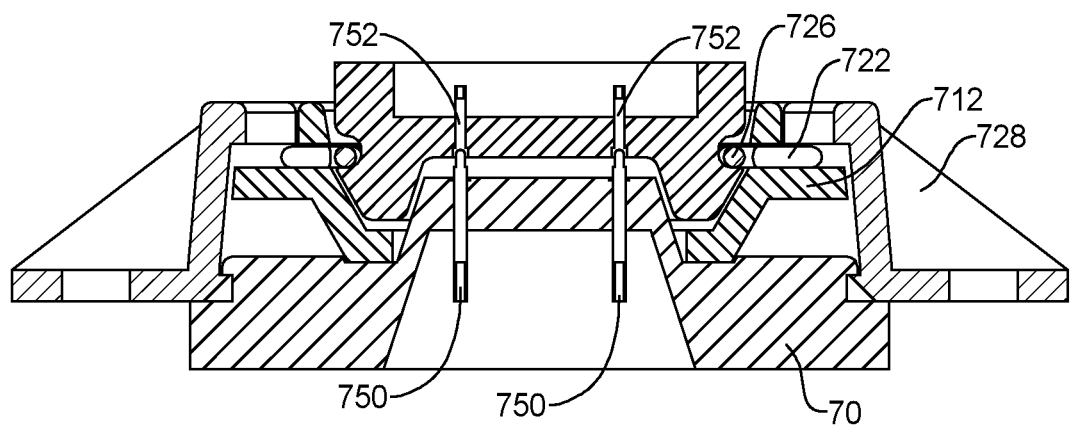
FIG. 7F is a cross-sectional view of the retainer of FIG. 7A with an electrical connection between the button and the retainer.

Referring now to FIG. 7F, the base 710 may have electrical contacts 750 disposed therein. The electrical contacts 750 may couple to electrical contacts 752 to provide an electrical connection therebetween. As will be described in more detail below, power may flow from the vehicle battery to the electrical contacts 750 and to the electrical contacts 752 to power a component, a light or other type of electrical device.

Figure 7G:
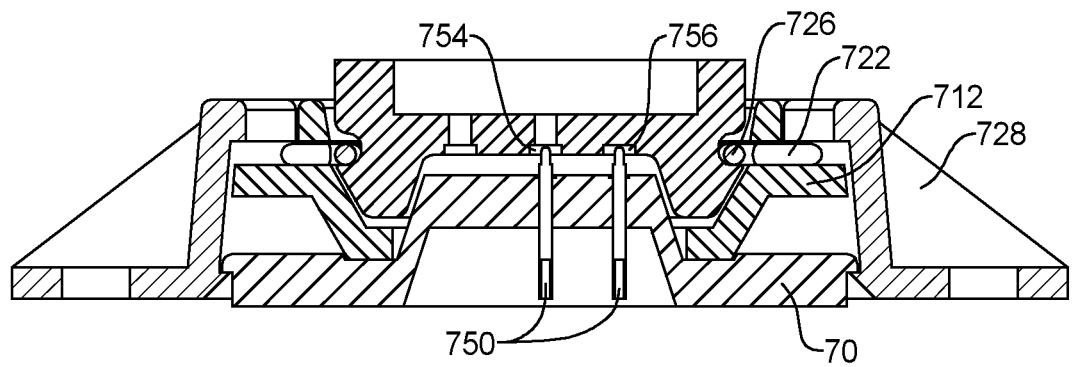
FIG. 7G is a cutaway view of an alternative electrical connection of the retainer of FIG. 7A.

Referring now to FIG. 7G, the electrical contacts 750 may be disposed in the center and to the right or left of the center. This allows a ring contact 754 and a center contact 756 to be used on the button 724 that is coupled to an electrical device. Although one ring contact 754 is illustrated with two electrical contacts 750, various numbers of contacts and various numbers of rings may be provided. For example, should signaling be required between devices, various numbers of contacts may be provided. With two contacts, power and ground are provided. However, with multiple contacts, various types of data communication, status signals and sensing may be provided to and from the vehicle.

Figure 7H:
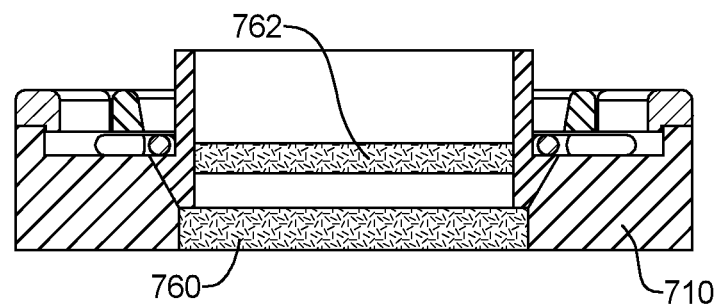
FIG. 7H is yet another cutaway view of a retainer having a wireless charging.

Referring now to FIG. 7H, the system may also use wireless charging. A charge pad 760 may be incorporated within the base 710. A wireless charge coil 762 may be disposed within the button 724 which may be part of an electrical device. Inductive charging or providing of power to the wireless charge coil may be provided. That is, the vehicle may charge the wireless charge pad 760.

Figure 7I:
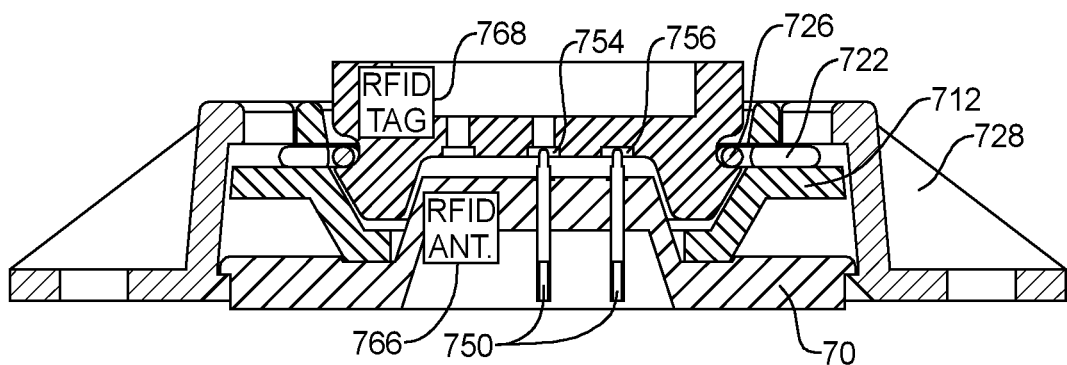
FIG. 7I is a cutaway view of the retainer of FIG. 7A with an RFID antenna and tag.

Referring now to FIG. 7I, a radio frequency identifier (RFID) antenna 766 may be incorporated into the base 710. An RFID tag 768 may be incorporated into the button 724 so that communication may take place therebetween. The tag 768 may be an identifier tag or may provide sensor or other type of data to the antenna 766.

Figure 8A:
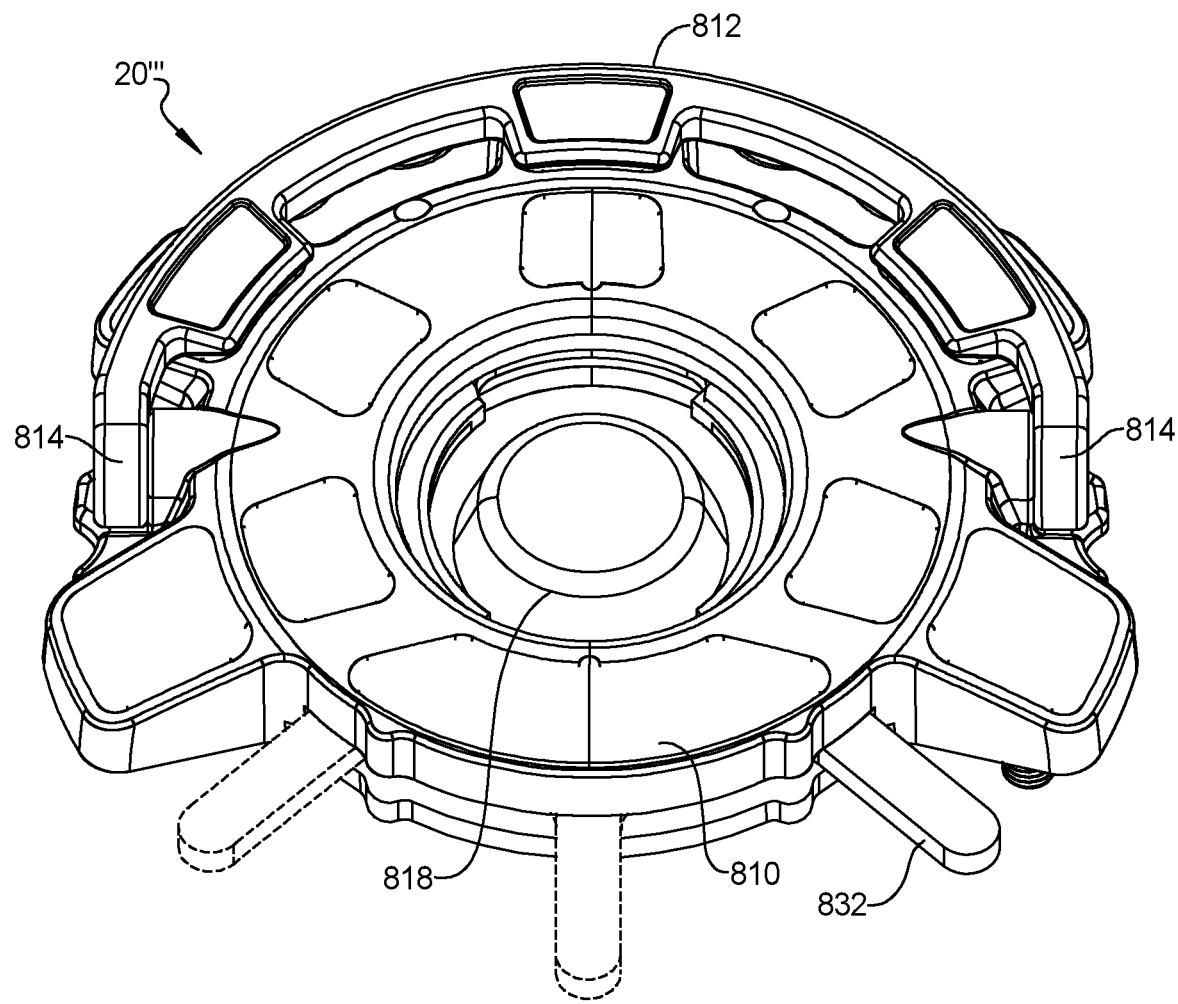
FIG. 8A is a top perspective view of a fourth example of a retainer.

Referring now to FIG. 8A-8F, another example of a retainer 20''' is set forth. The retainer 20''' operates in a similar manner to that set forth above with respect to the retainer 20''. The housing 810 has a handle 812 that is coupled to pivot points 814 disposed on the outer surface of the housing 810. The handle 812 is in folded position as illustrated in FIG. 8A. In an upright or unfolded position, the handle 812 extends over the housing and acts as a handle to allow rotate the entire housing 810 relative to a track or bracket for fixing the retainer 20''' thereto.

Figure 8B:
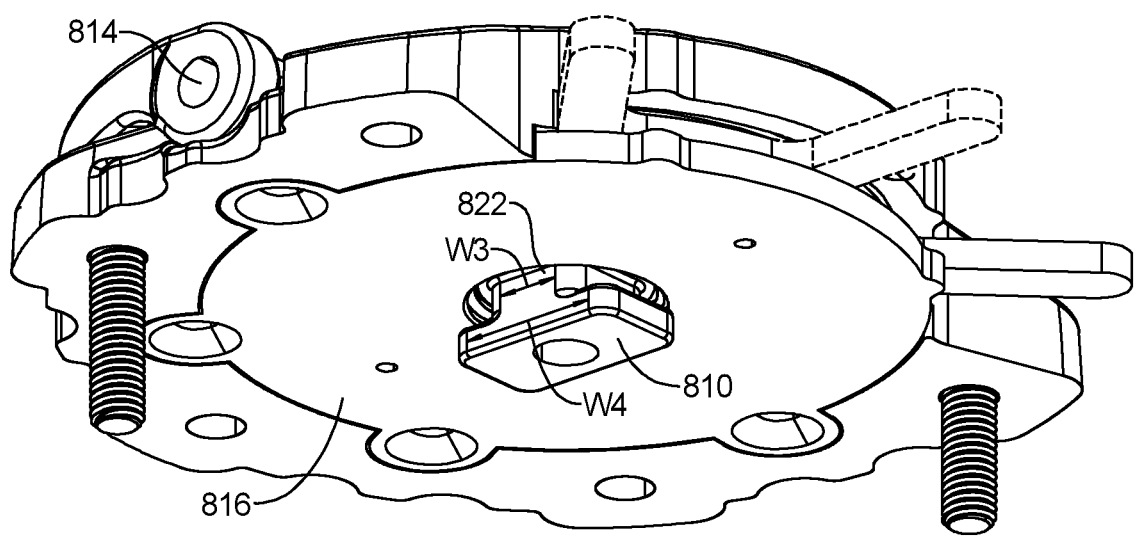
FIG. 8B is a bottom view of the retainer of FIG. 8A.
Figure 8C:
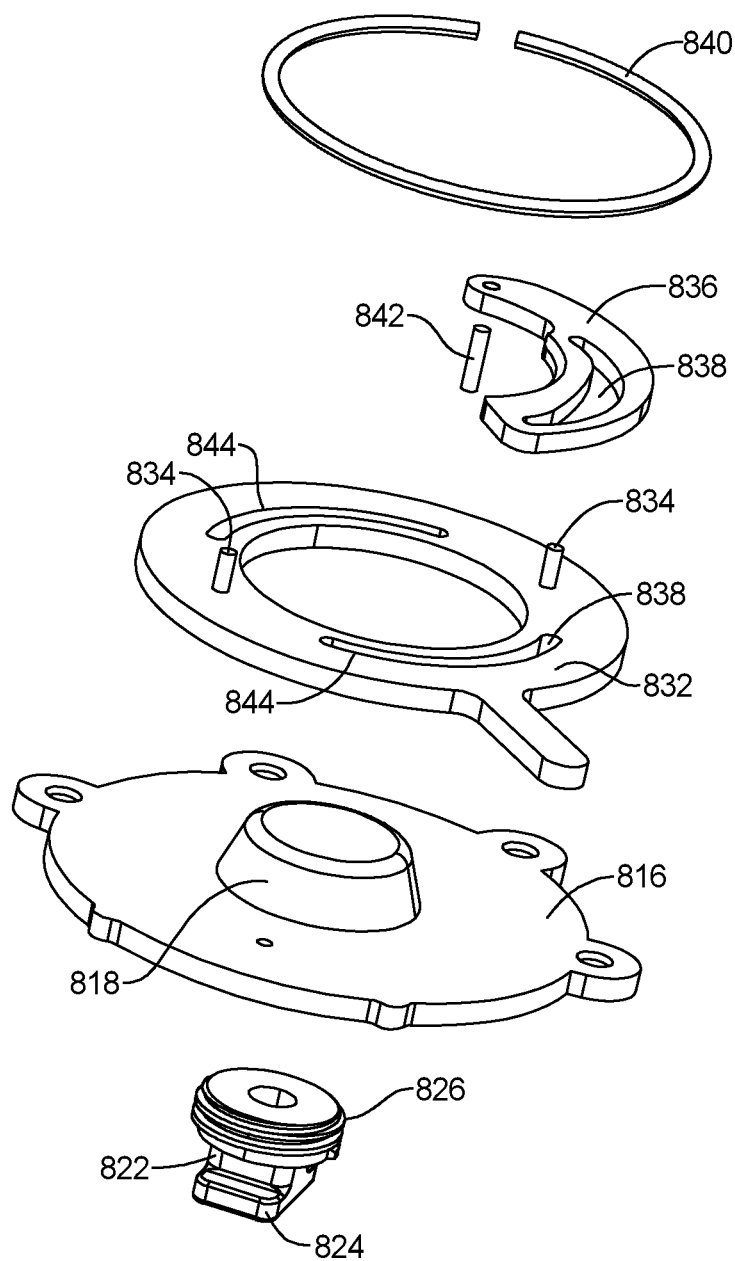
FIG. 8C is a top perspective view of the retainer of FIG. 8A.
Figure 8D:
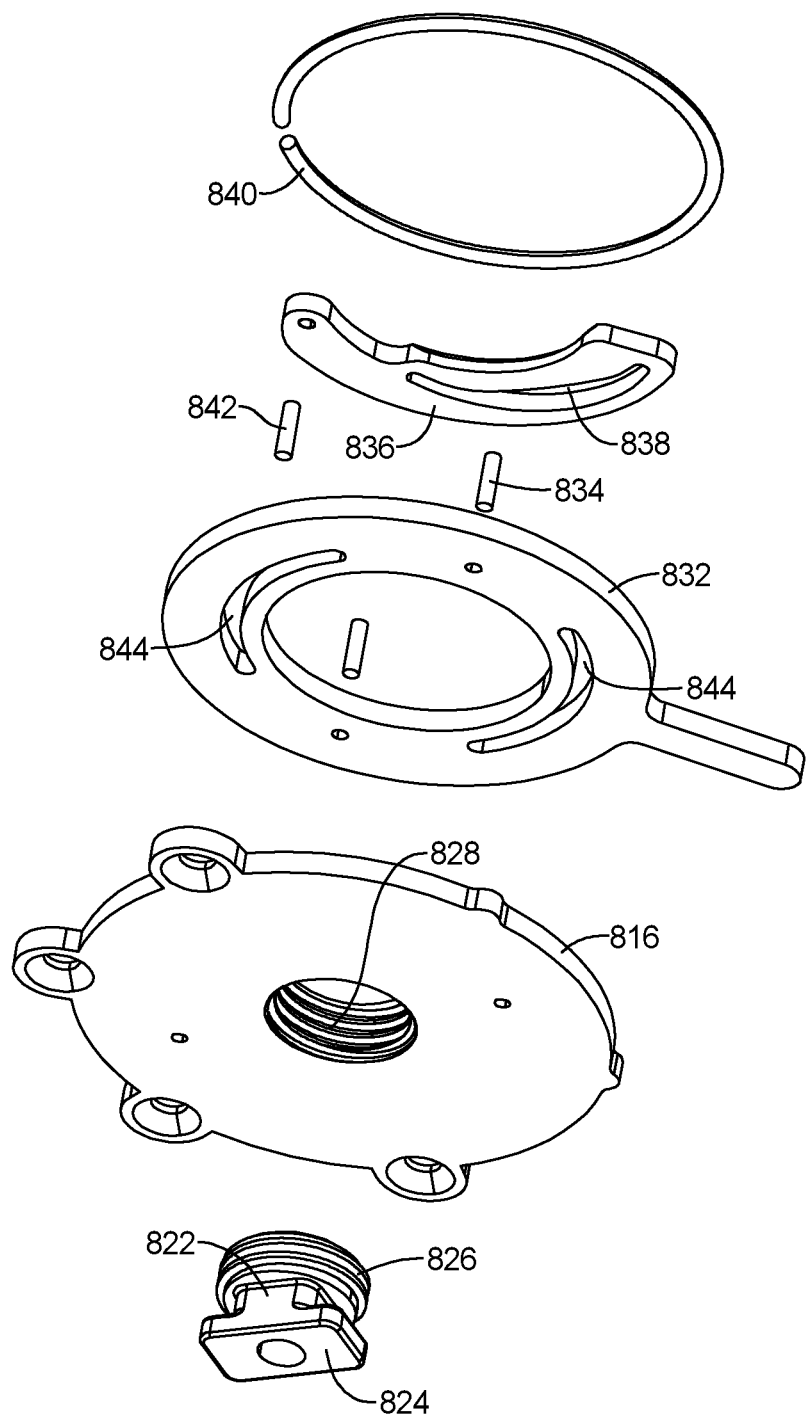
FIG. 8D is a bottom perspective view of the retainer of FIG. 8A.
Figure 8E:
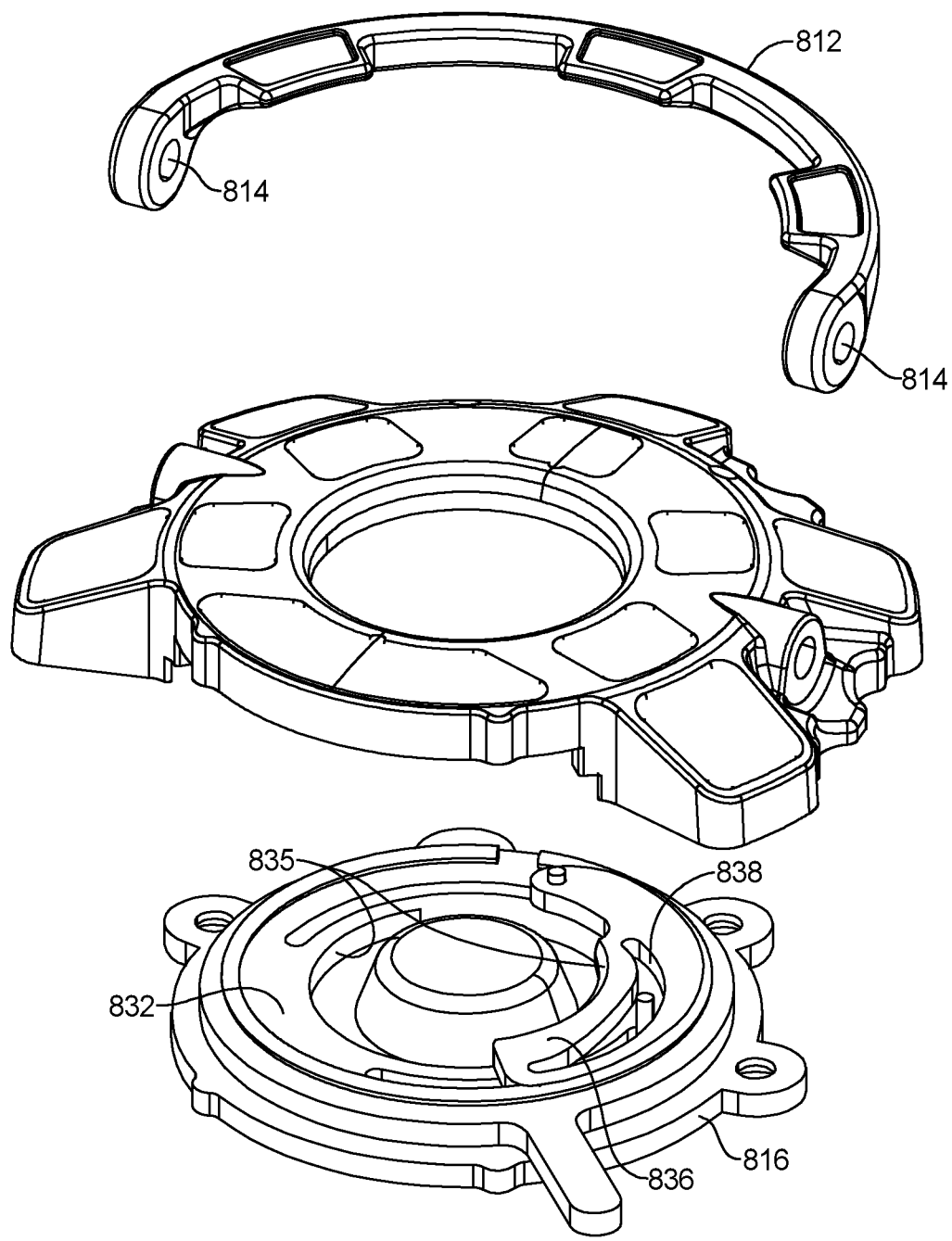
FIG. 8E is a top perspective view of the retainer of FIG. 8A.
Figure 8F:
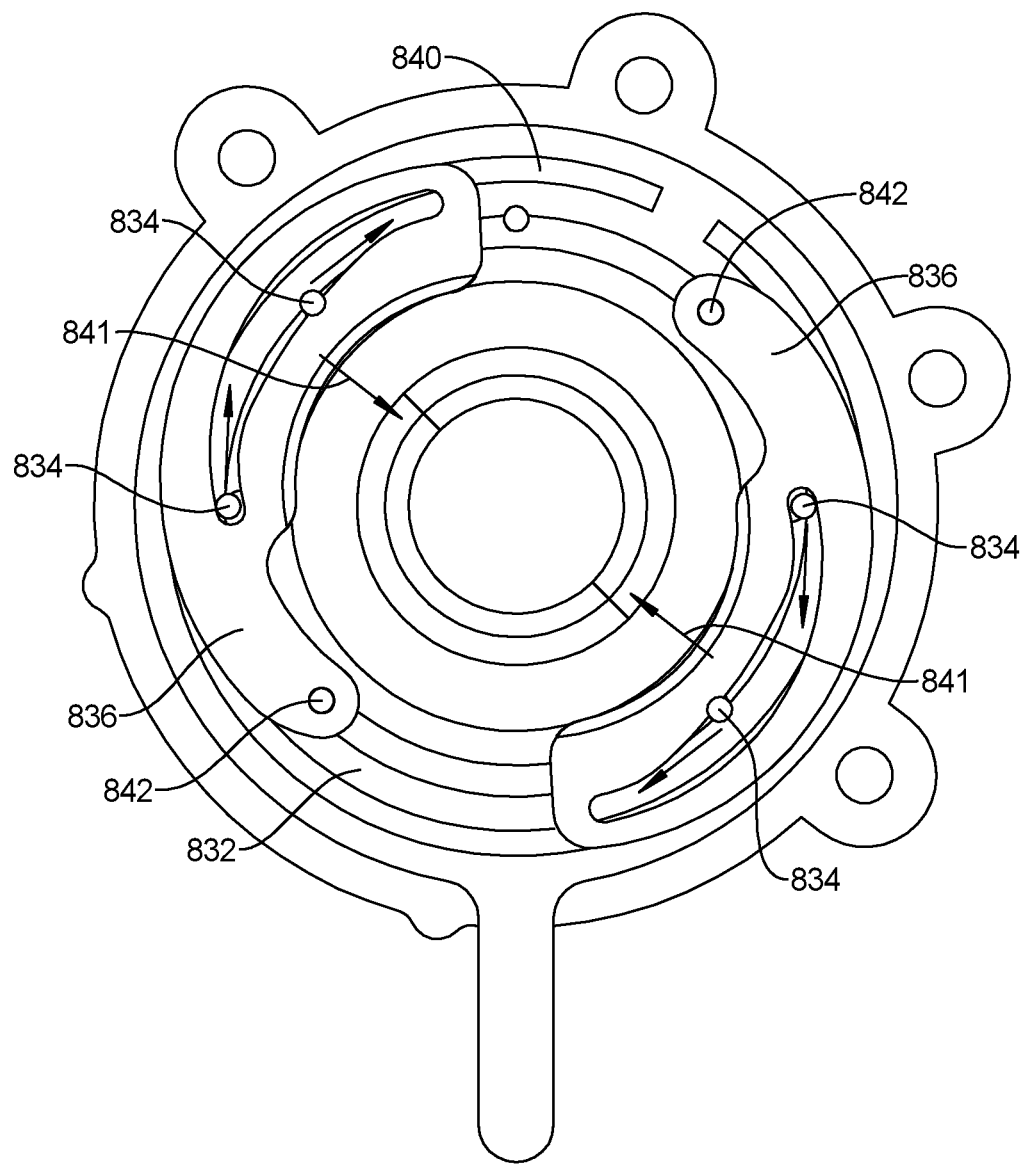
FIG. 8F is a top view of the retainer of FIG. 8A.

Referring specifically to FIG. 8B, an engagement member 820 has a first portion 822 and a second portion 824. The first portion 822 has a width $W_3$ that is sized to be just narrower than the width W1 of the elongated opening 30 illustrated in FIG. 2A. The second portion 824 has a width narrower than the channel 26. The engagement member 820 engages like the engagement member 96 illustrated above. That is, the engagement member 820 may be placed over the locating opening 32 and positioned in place anywhere along the elongated opening 30 outside of the locating opening 32. As is best shown in FIGS. 8C and 8D, a threaded portion 826 engages with internal threads 828 of a recess 818 of base 816.

A rotating member 832 has pins 834 that extend therefrom. In this example, two pins 834 extend from the rotating member 832. The pins 834 rotate with the rotating member 832 in much the same way as the spring extensions 718 described above. However, in this example, a cam 836 has a cam groove 838 that is partially annular and receives the pins 834. The cam groove 838 is positioned to move in a direction inward illustrated by the arrow 841 of FIG. 8F. That is, as the rotating member 832 rotates in a clockwise direction (when viewed from the bottom, the pins 834 urge the cam 836 inward so that the circumferential groove 726 of the button 724 is engaged. In the counterclockwise direction, the rotating member 832 urges the cams 836 outward as the pins 834 move in the cam groove 838. A spring 840 urges the cam 836 inwards. The rotating member 832, the pins 834 and the cam 836 may be referred to as a securing member. Of course, more than one cam 836 may be provided. That is, in the size illustrated, two cams 836 may easily fit within the housing 810. Of course, three cams or various numbers of smaller cams may be provided depending upon the desired securing conditions. Thus, as the pins 834 move clockwise, the cam 836 is urged inward and as the pins 834 move counterclockwise, the cam 836 moves inwards and outwards. The pins 842 are received in channels 844. The rotation of the rotating member 832 limited to the length of the groove and the interaction of the fixed pin 842 therein.

The cam 836 (or cams 836) may rotate about pins or pins 842. The pins 842 may be partially received in the housing 810 so that they are stationary during the engagement process. The pins 842 may be fixed in place by but not limited to adhesive, welding or an interference fit. The edge 835 of the cam 836 that engages the circumferential groove of the button may be tapered or reduced in thickness more easily engage.

Figure 8G:
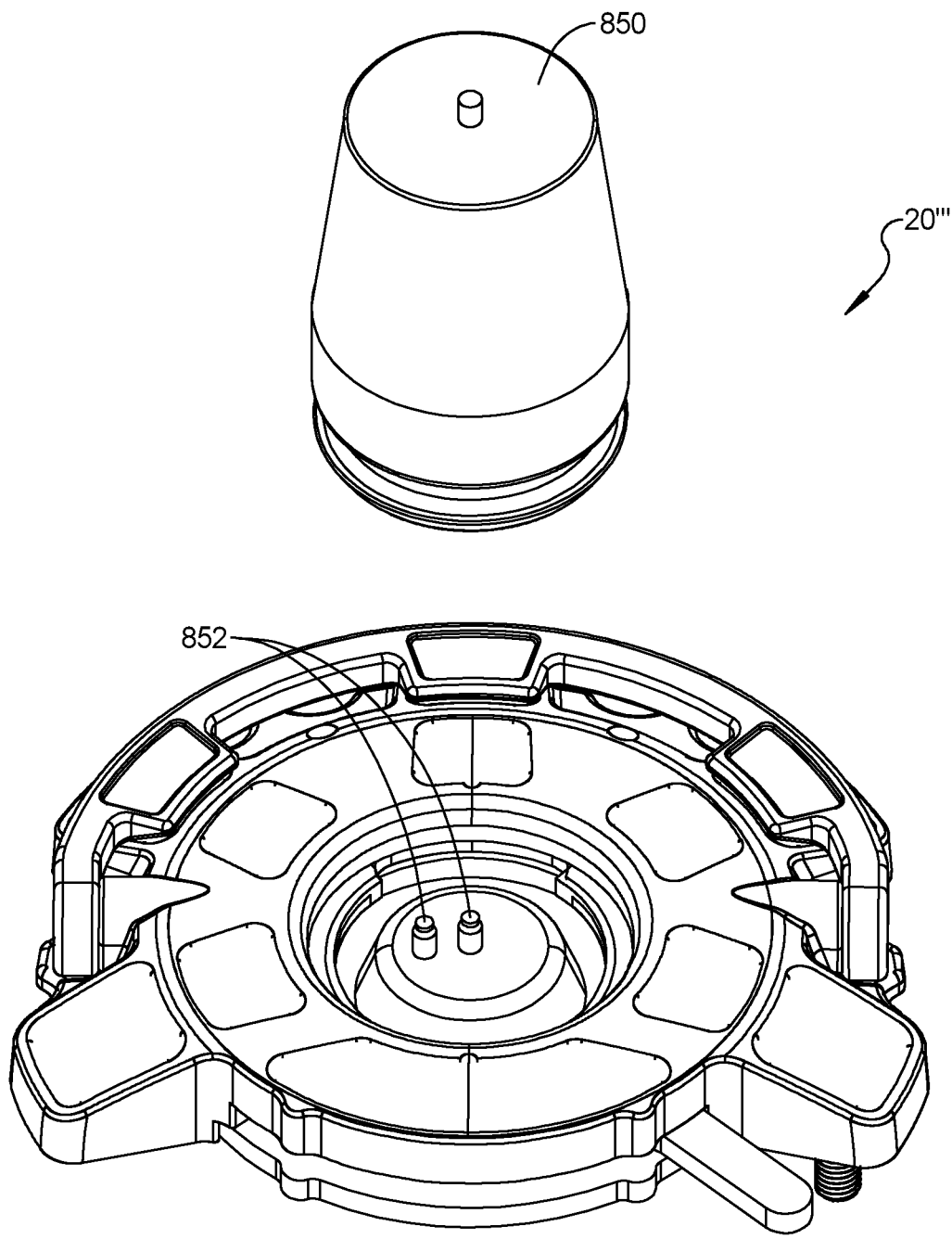
FIG. 8G is a perspective view of an electrical component to be coupled to the retainer of FIG. 8A.
Figure 8H:
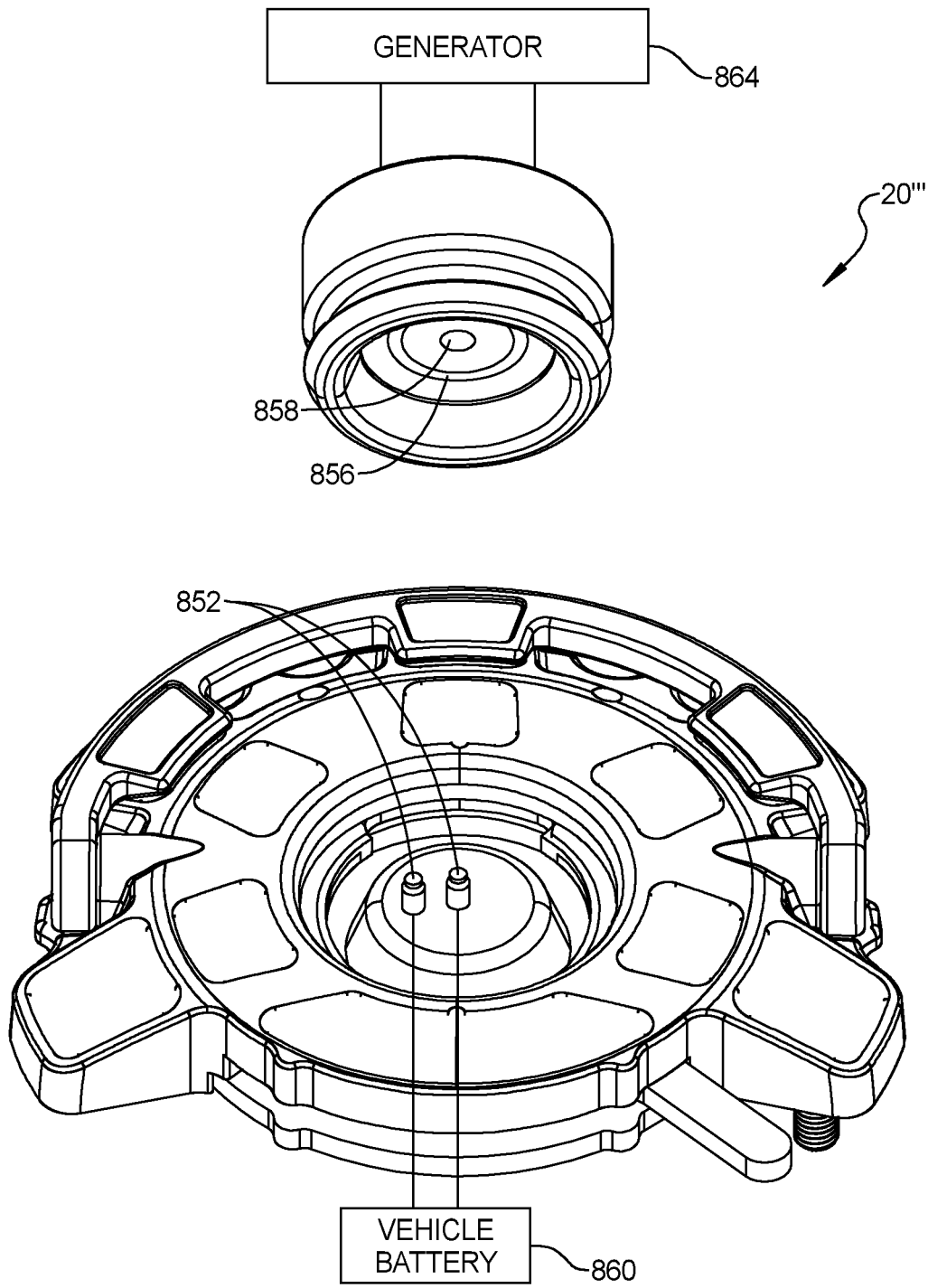
FIG. 8H is an electrical generator connector formed from the retainer of FIG. 8A.

Referring now to FIG. 8G, an electrical device 850 is illustrated adjacent to the retainer 820'''. Contact 852 may provide to or from the vehicle. As is best shown in FIG. 8H, an annular contact 856 and a center contact 858 may be used to contact the contacts 852 to reduce orientation issues with the orientation of the electrical devices or buttons. The vehicle battery 860 may provide power to the contacts 852. As illustrated in FIG. 8G, an electrical device 850 may be coupled to the retainer 20'''. However, a generator 864 may also be coupled to the contacts 856, 858. In this manner, should the vehicle be an electric vehicle or require a regular vehicle to charge the vehicle battery 860, the generator 864 may provide power to the vehicle.

Figure 9A:
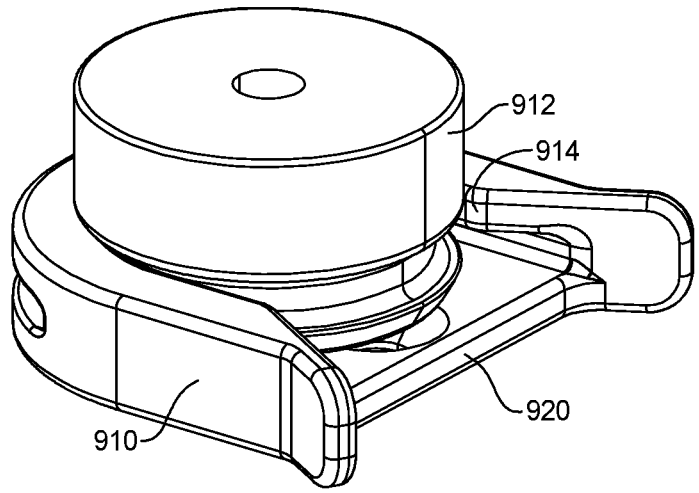
FIG. 9A is a perspective view of a button holder for partially securing a button.
Figure 9B:
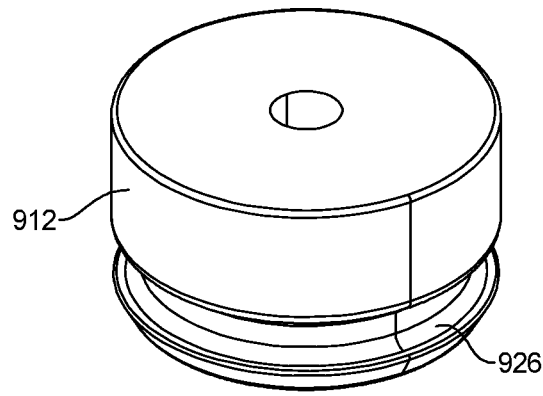
FIG. 9B is a perspective view of the button holder of FIG. 9A.
Figure 9B:
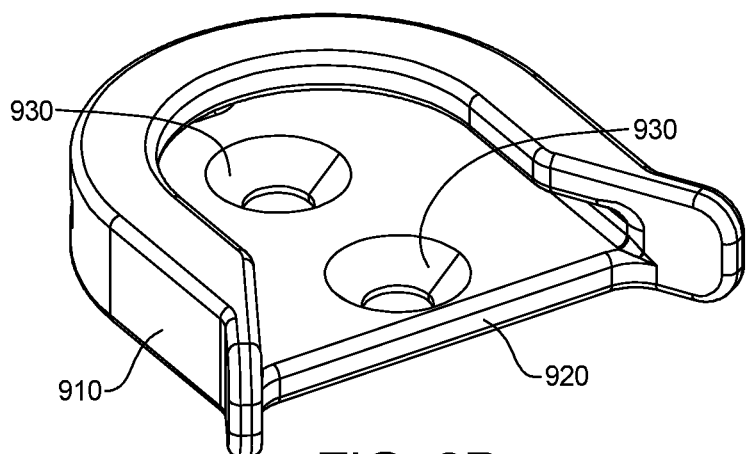

Referring now to FIG. 9, should the device have many corners or sides that need to be secured, some of the sum or one of the corners may be secured with one of the retainers described above. However, a less secure method provides a button holder 910 that receives the button 912. The button holder 910 has a wall extension 914 extending therein. The button holder 910 has a base 920 that is generally U-shaped. The wall extension 914 is also U-shaped and may be flexible to engage the button, and in particular, the circumferential groove 926 of the button 912. Fastener holes 930 may be used to screw or fasten the button holder 910 to a vehicle or other mounting structure.

Figure 10A:
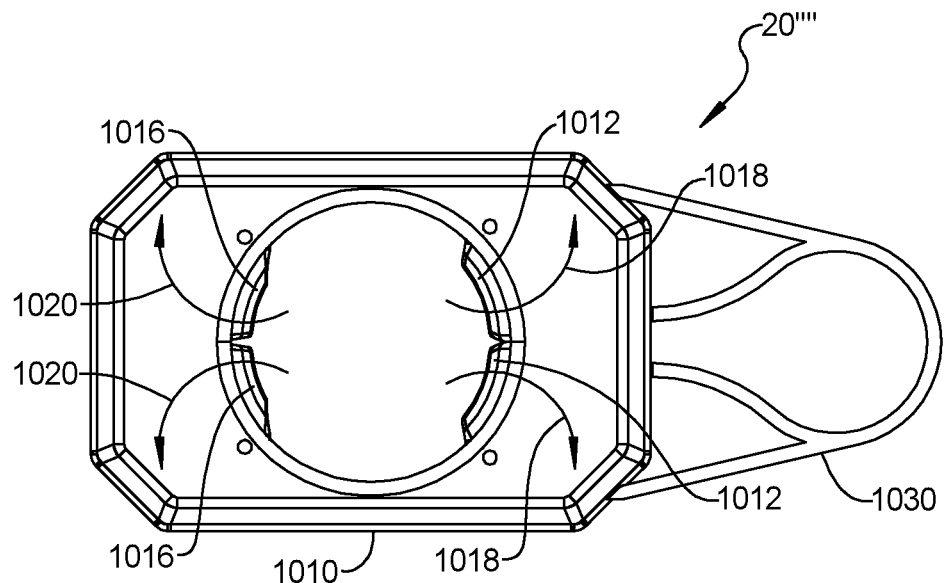
FIG. 10A is a top view of a fifth example of a retainer.
Figure 10B:
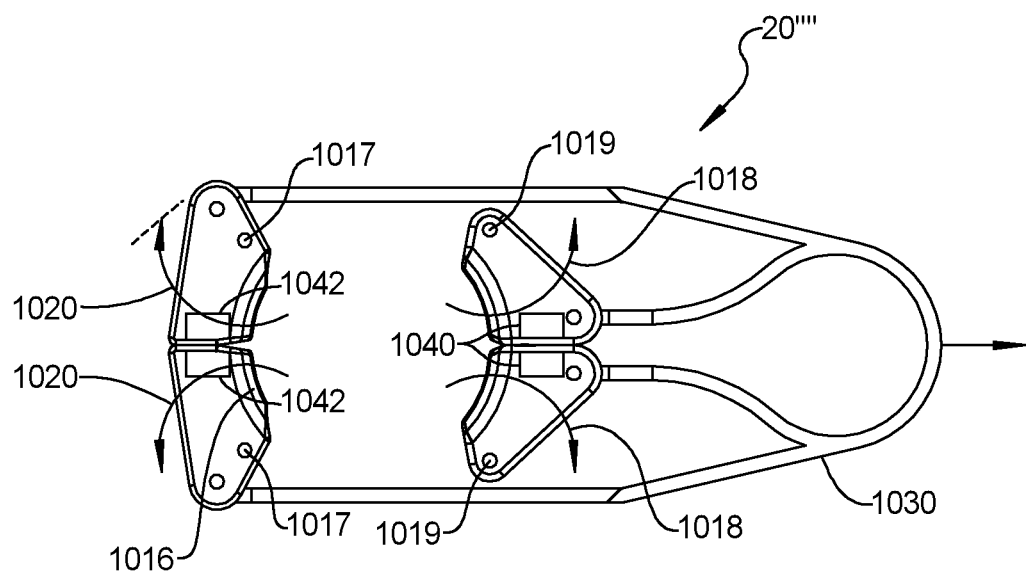
FIG. 10B is a cutaway view of the inside of the retainer of FIG. 10A.

Referring now to FIGS. 10A and 10B, an alternative retainer $20^{IV}$ is provided. In this example, a housing 1010 has securing member 1012 and 1016 coupled thereto. The securing members 1012, 1016 rotate in a manner illustrated by the respective arrows 1018, 1020, a handle 1030 is coupled to the securing members 1012, 1016. The handle 1030 is flexible and allows the securing members 1016 to rotate about the pivots 1019 and the securing members 1016 to rotate about the pivots 1017.

Magnets 1040, 1042 disposed on the respective securing member 1012, 1016 may allow the securing members to secure the button 912 therein. In FIGS. 10A and 10B, the securing members are in a closed or locked position. When moved to the position illustrated by the arrows, the retainer $20^{IV}$ is opened. The handle 1030 may provide enough rigidity to assist the securing members 1012, 1016 into the locked position.

Figure 11A:
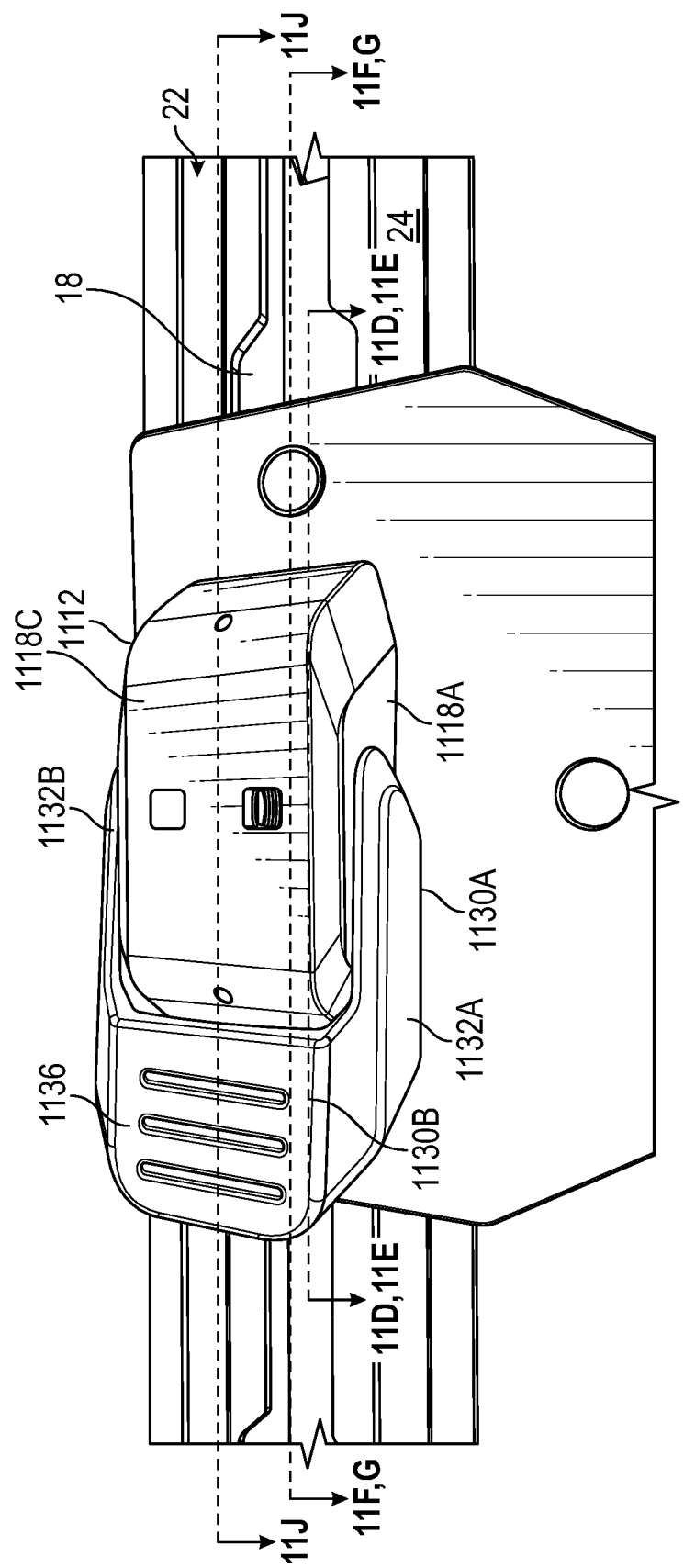
FIG. 11A is a top perspective view of another example of a retainer in a locked position.
Figure 11B:
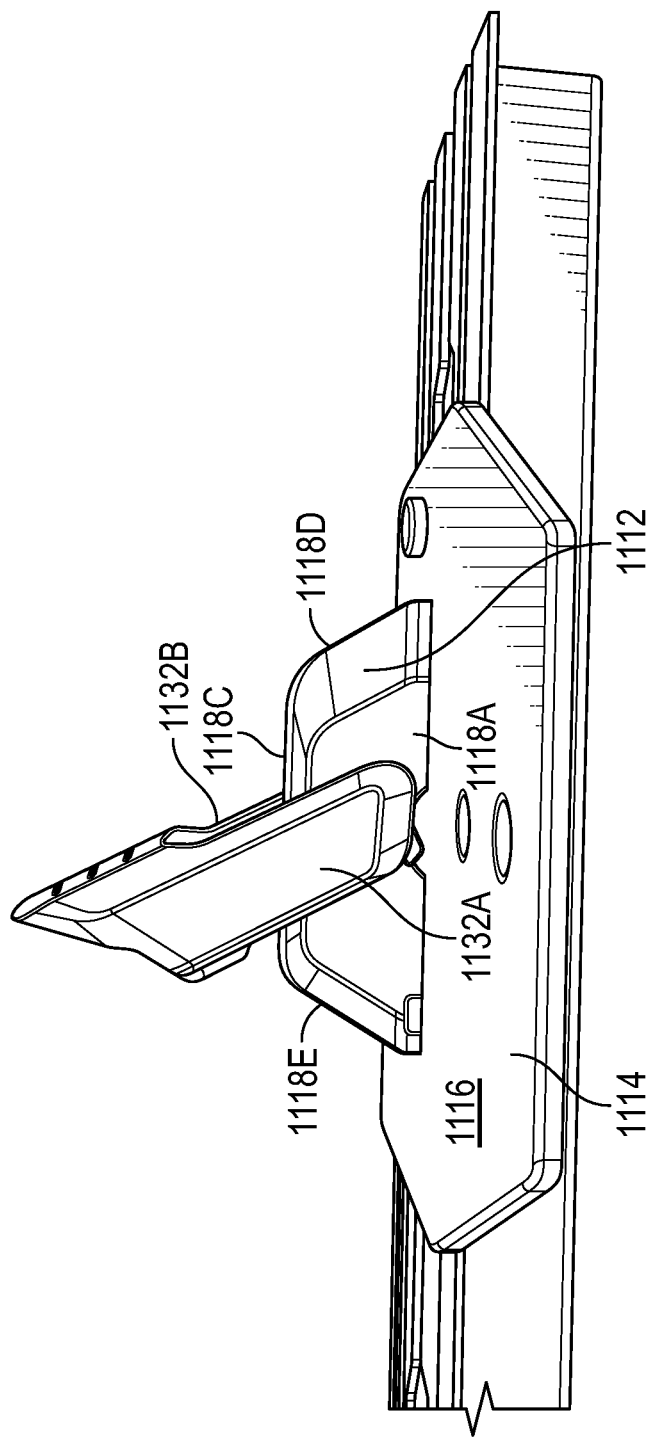
FIG. 11B is a side perspective view of the retainer of FIG. 11A having the lever in an unlocked position.

Referring now to FIGS. 11A and 11B, another example of a retainer 1110 is set forth. The retainer 1110 is shown relative to a rail 22 having a receiver 18 disposed therein. The rail 22 and the receiver 18 were described in further detail above. The rail 22 and the receiver 18 form the channel 26. Ultimately, the retainer 1110 is secured to the rail 22 and the outer wall 24 that defines the channel 26.

A housing 1112 is mounted to an article 1114, a portion of which is illustrated. The article 1114 has an article wall 1116. The article wall 1116 and the housing 1112 are coupled together to form the retainer. The article 1114, one or more retainers 1110 are used to secure an article 1114 to the rail 22. As mentioned above, examples of articles include but are not limited to tool mounts, utensil mounts, coolers and other equipment. The retainer 1110 may secure the article 1114 in a bed of a utility vehicle, on the side of utility vehicle or on a wall of a utility vehicle. However, the retainer 1110 may also be used outside of the automotive vehicle setting such as for storage in a building.

The housing 1112 is formed from a plurality of surfaces. In the present example, the surfaces 1118 generally form a trapezoid shape when viewed from the side view. That is, the surfaces 1118 include two generally trapezoid shape surfaces 1118A and 1118B. A top surface 1118C extends between the side surfaces 1118A, 1118B and two angular surfaces 1118D and 1118E. The surfaces 1118 enclose the interior of the housing 1112 together with the article wall 1116. While the surfaces 1118 and the article wall 1116 form a trapezoid solid, other shapes such as rectangular solid or an irregular solid shape may be formed. The housing 1112 may also have an additional surface 1118 adjacent to the article wall 1116. That is, the underside of the housing 1112 may also be enclosed with a wall that is ultimately fastened to the article 1114 or article wall 1116 of the article 1114.

A lever 1130 is rotatably coupled to the housing 1112. The lever 1130 has a first end 1130A and a second end 1130B. The first end rotates relative to the housing 1112. In this example, the first end 1130A has a first arm 1132A and a second arm 1132B. The arms 1132A, 1132B are directly adjacent to the surfaces 1118A and 1118B. A handle 1134 extends between the first arm 1132A and the second arm 1132B. In the example of FIG. 11A, the retainer 1110 is locked to the rail 22 when the handle 1134 is rotated and is closer to the article wall 1116. The retainer 1110 is unlocked in FIG. 11B and slidable relative to the rail 22 when the handle 1134 and thus the lever 1130 is rotated away from the article wall 1116 as illustrated in FIG. 11B. Of course, the handle and the locking position may be reversed depending upon how the lever 1130 is formed as will be further described below.

The handle 1134 has a gripping surface 1136 disposed thereon. In this example, the gripping surface 1136 comprises a plurality of laterally extending grooves. Of course, the handle 1134 may have the gripping surface 1136 formed of a soft pliable material or other types of materials that enable a user to grasp the gripping surface 1136.

Figure 11C:
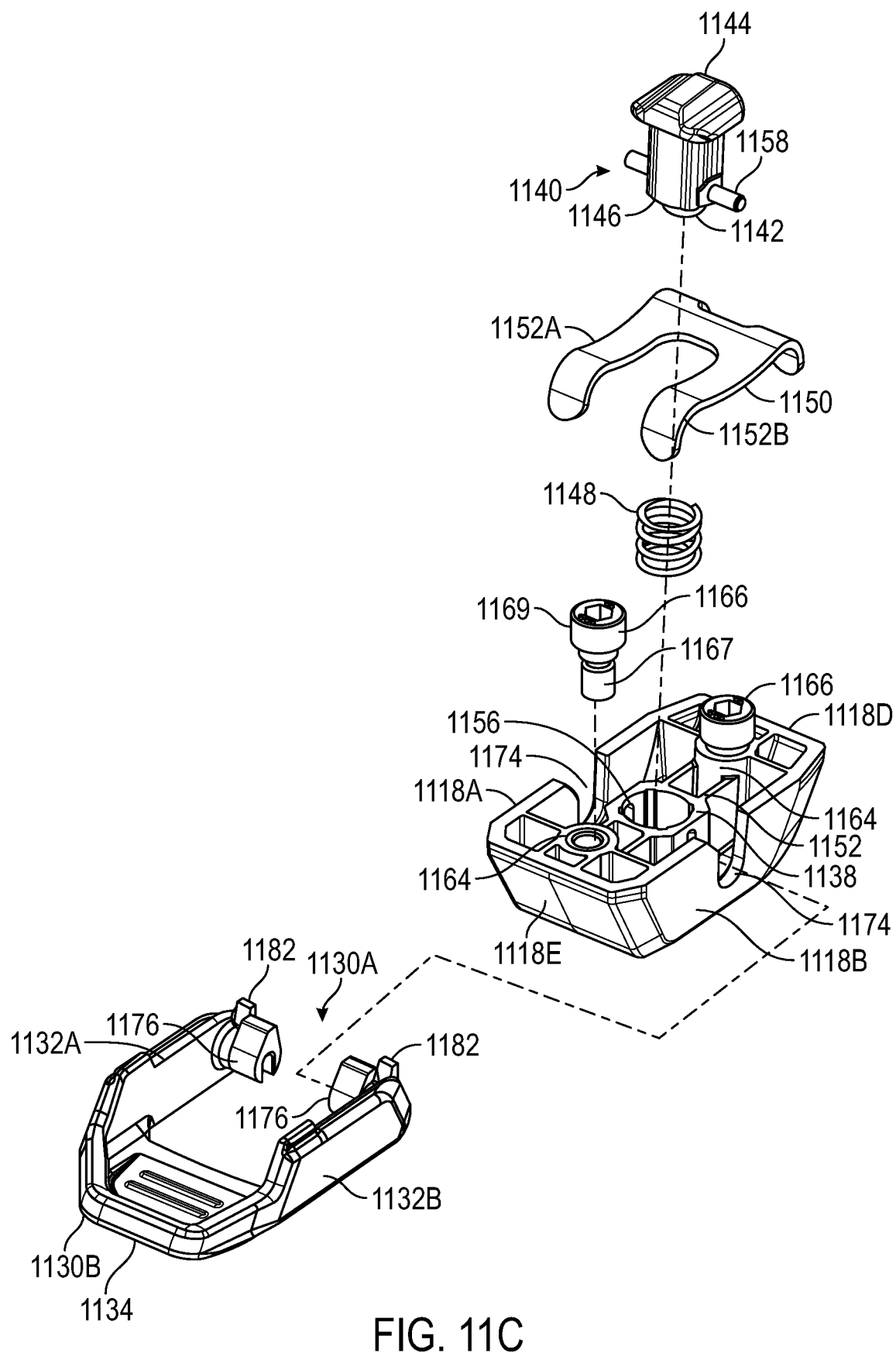
FIG. 11C is an exploded view of the retainer of FIGS. 11A and 11B.

Referring now to FIG. 11C, the retainer 1110 is illustrated in an exploded view. In this example, the retainer 1110 is turned to expose the underside. The housing 1112 has a plunger receiver 1138 formed therein. The plunger receiver 1138 may be integrally formed with the housing 1112. The housing 1112 may be molded from plastic. The plunger receiver 1138 has a shape designed to fit at least a portion of a plunger 1140 therein. In the example, the plunger body 1142 is received within the plunger receiver 1138. As will be shown in more detail below, the plunger body 1142 is a rounded rectangular shape in cross section. However, other types of cross sections may be used. The plunger 1140 also includes a foot 1144. The foot 1144 is larger in cross section than the plunger body 1142 and acts an engagement means for engaging or locking the retainer to the outer wall 24. The foot 1144 does not enter the plunger receiver 1138 during operation. That is, the width of the plunger body is just smaller than the size of the plunger receiver 1138. The foot 1144 is longer and/or wider than the plunger receiver 1138. As illustrated in FIG. 11I, the width of the plunger body 1142 is $W_1$. The width of the foot 1144 is $W_2$. The width $W_2$ is greater than the width $W_1$. A shoulder 1146 provides a surface against which a coil spring 1148 placed into the plunger receiver 1138 pushes against. That is, the coil spring 1148 urges the plunger 1140 outward from the plunger receiver 1138 during operation. A leaf spring 1150 is also disposed within the housing 1112. The leaf spring 1150 is supported on ridges 1152 that form walls within the housing 1112. In this example, the leaf spring 1150 provides a cam engaging surface 1151 as will be described in more detail below. The cam engaging surface 1151 of the leaf spring 1150 flexes. The leaf spring 1150 is curved and is used to allow various tolerances within the rail 22. In this example, the leaf spring 1150 has a first spring arm 1152A and a second spring arm 11526 that extend on either side of the housing around the plunger receiver 1138.

The plunger receiver 1138 has a slot 1156 disposed on either side thereof. The slot 1156 receives a pin 1158 that extends through the plunger body 1142. The slot defines the distance the plunger moves relative to the housing 1112.

The plunger body 1142 may also include alignment features 1162 such as grooves and slots that align with grooves and slots within the plunger receiver 1138. The alignment features 1162 extends longitudinal along the plunger body 1142 in this example. A hole 1160 extends through the plunger body 1142 to receive the pin 1158.

The housing 1112 includes a fastener receiver 1164. In this example, two fastener receivers 1164 are disposed and integrally formed with the housing. The fastener receivers 1164 receive fasteners 1166. The fasteners 1166 are received within the fastener receivers 1164. In this example, the fastener receivers may be threaded and received within the threads formed within the fastener receiver 1164. However, a sleeve 1168 may of a metal material may be molded into the plastic or material of the housing 1112 and is used to receive the fastener 1166. That is, the fastener receiver 1164 may be integrally molded with the housing and a sleeve 1168 may be molded or secured therein. The sleeve 1168 may have threads therein for receiving the threads on the fastener 1166. The threads 1167 are illustrated on the fastener 1166 may have a head 1169 that has a width wider than the shaft having the threads 1167 thereon. The head 1169 forms a shoulder 1170 that is used to retain the article wall 1116 against the housing 1112. That is, the housing 1112 may be secured to the article wall 1116 using the fastener 1166. The head 1169 acts as an alignment feature that is received within the channel 26 of the rail 22. Although two alignment features such as the features 1166 are illustrated, one or three or more fasteners or alignment features may be provided. The fasteners 1166 and the foot 1144 of the plunger 1140 are used for preventing rotation of the housing 1112 relative to the rail 22 during operation. The fastener 1166 and the relative position of the article wall 1116 are best illustrated in FIG. 11H. The article wall 1116 has an opening 1172 to allow the plunger body 1142 and the foot 1144 of the plunger 1140 to extend therethrough and allow the foot to clamp to the rail 22 on the opposite side of the outer wall 24 as the housing 1112. In FIG. 11H, the plunger 1140 is illustrated in a clamped or retained position within the rail 22. The force of the foot 1144 is provided upward in FIG. 11H and the lever arm together with the position of the other components forces the plunger 1140 in an upward direction which corresponds to the plunger 1140 being received further within the plunger receiver 1138.

Referring back to FIG. 11C, the housing 1112 has a lever opening 1174. In this example, two lever openings 1174 are disposed in the outer surfaces 1118A, 1118B. The lever openings 1174 extend from the housing 1112 near the article wall 1116 toward the upper surface 1118C.

The lever 1130, at the first end 1130A, has a cam 1176 disposed on either arm 1132, 1132B. The cam 1176 has an outer surface that allows the movement and locking of the pin 1158 in the pin opening 1178. The operation will be described in more detail below. Between the cams 1176 disposed on either arm 1132A, 1132B is a shaft surface having a width sized to accommodate the surfaces 1118A and 1118B. A tab 1182 may be provided to engage with the stop 1184 at each of the lever openings 1174. The tab 1182 acts as a rotation limiter Referring now to FIG. 11D, the stop 1184 is illustrated with the tab 1182 disposed therein. When the tab 1182 rotates due to movement of the lever 1130, the rotational movement of the lever 1130 is prevented based on the angle of the stop 1184 and the position of the tab 1182. That is, the tab 1182 rotates with the lever arm and prevents movement beyond the stop 1184 formed in the surfaces of the housing 1112 at the lever openings 1174. The lever opening 1174 also prevents the rotation of the lever in a clockwise direction when the tab 1182 hits the surface 1118B, as illustrated in FIG. 11E.

Figure 11D:
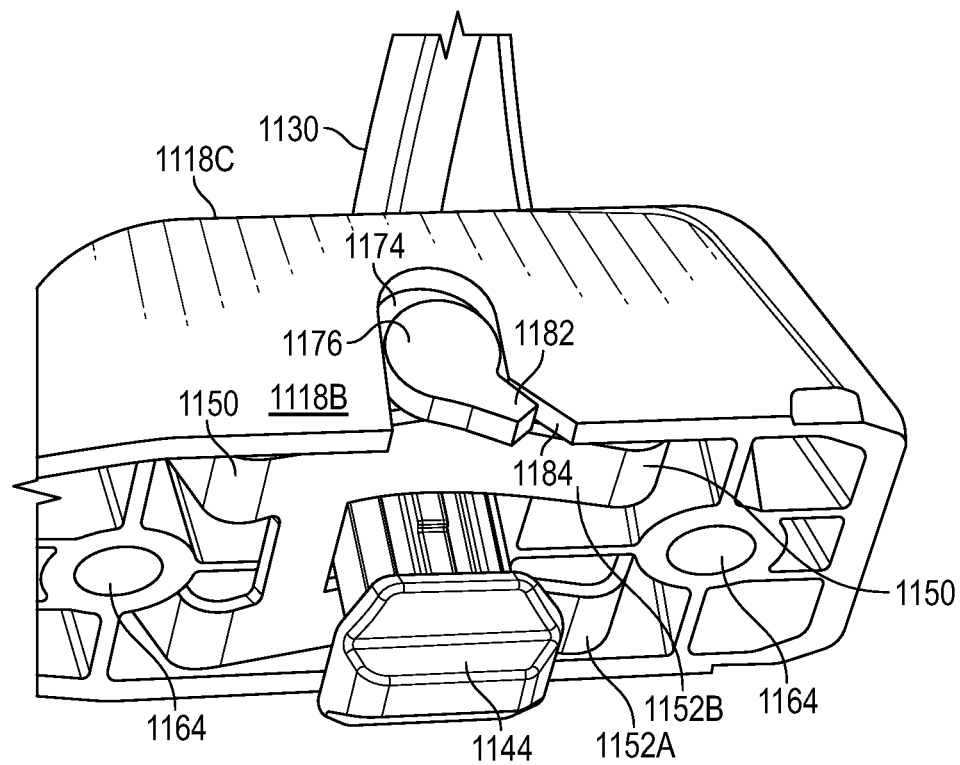
FIG. 11D is a cutaway view of the retainer through the cam so the position of the tab is illustrated in an unlocked position.
Figure 11E:
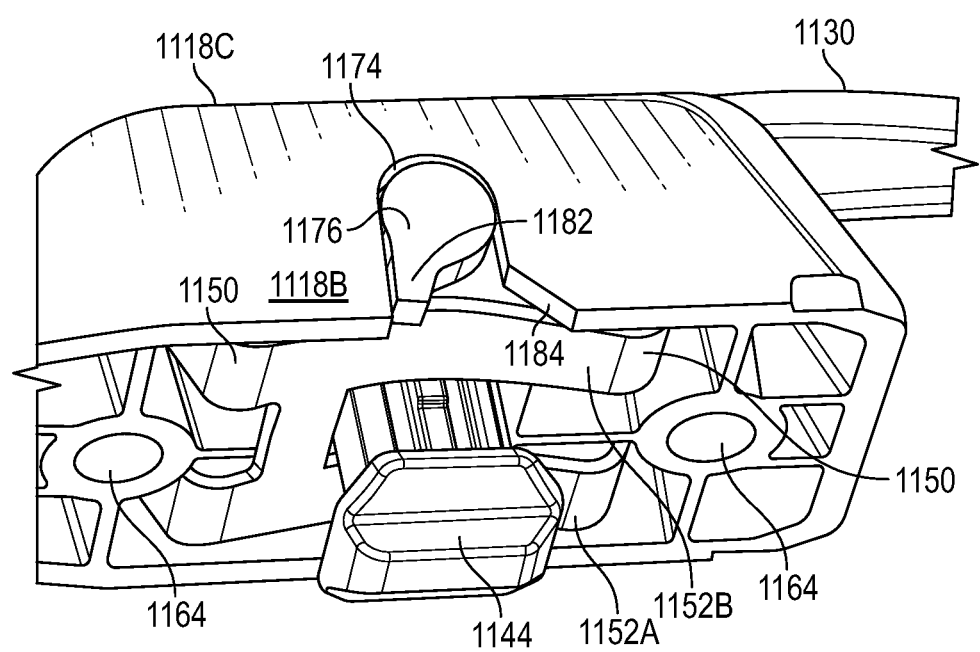
FIG. 11E is a cutaway view similar to that of FIG. 11D except in a locked position.

In FIG. 11D and FIG. 11E, the leaf spring 1150 has the spring arms 1152A and 1152B disposed within the housing 1112. The longitudinal ends of the leaf springs 1150 are curved and extend inward toward the surface 1118C within the housing 1112. As illustrated, the cam 1176 rides on the cam engaging surface 1151 surface of the leaf spring 1150, and more particular, the surface of the spring arms 1152A and 1152B. The leaf spring 1150 urge the cam 1176 in a direction toward the surface 1118C.

Figure 11F:
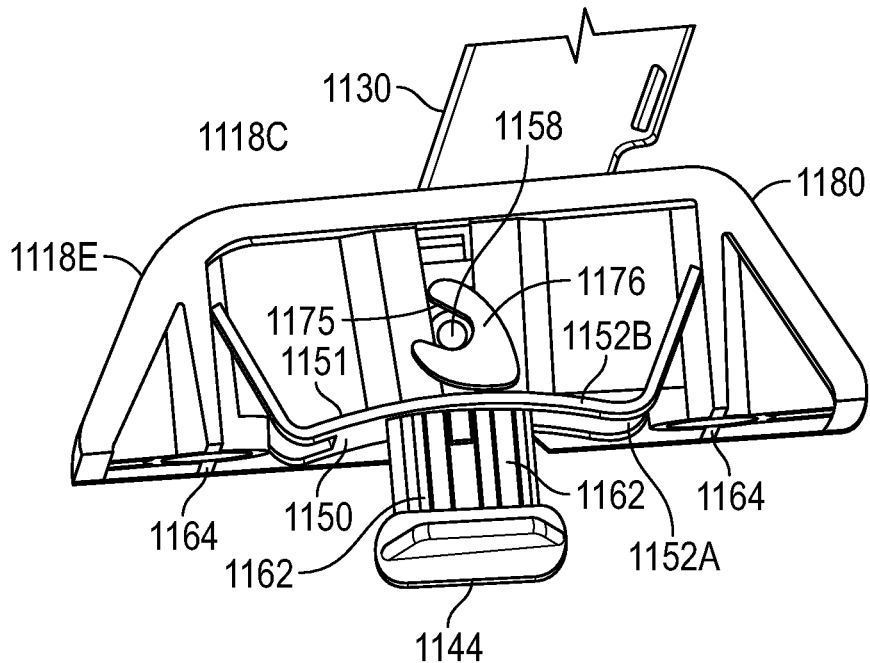
FIG. 11F is a cross sectional view through the cam illustrating the position of the pin opening.
Figure 11G:
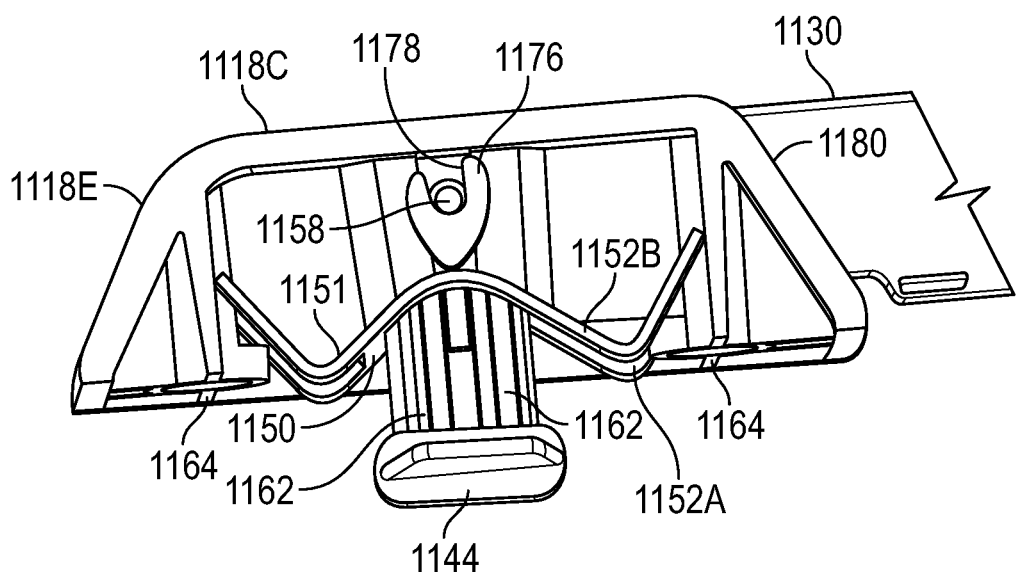
FIG. 11G is the cross sectional view of FIG. 11F except with the cam 1176 in the locked position.
Figure 11H:
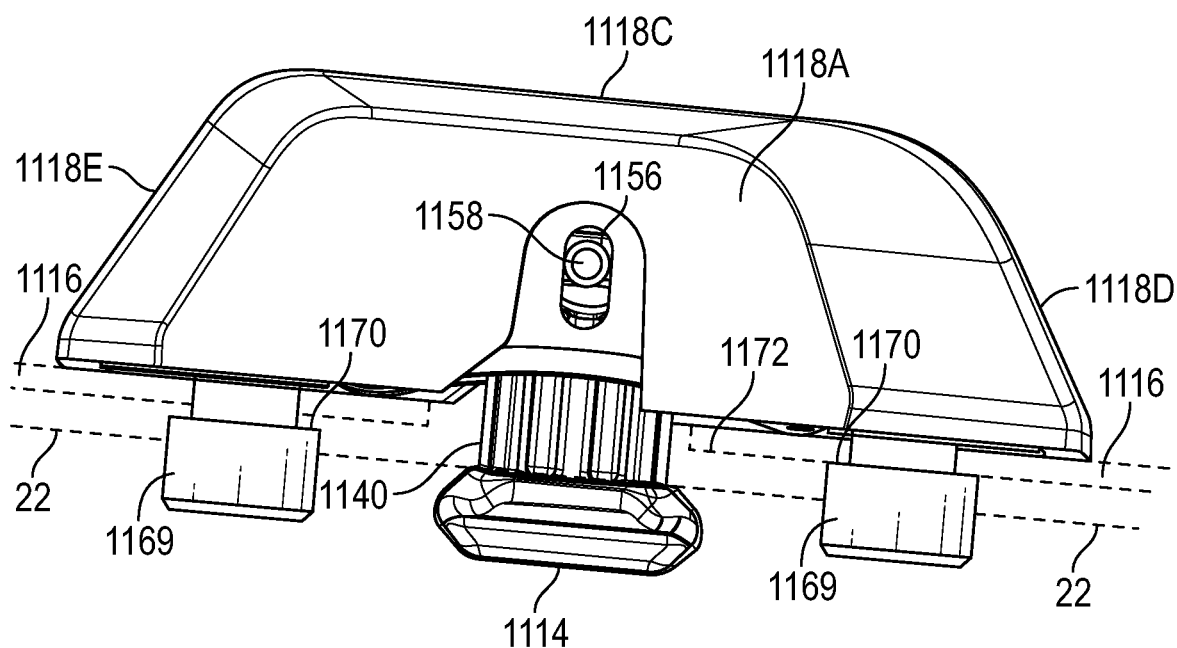
FIG. 11H is a cutaway view of the housing 1112 showing the pin 1158 within the slot 1156.
Figure 11I:
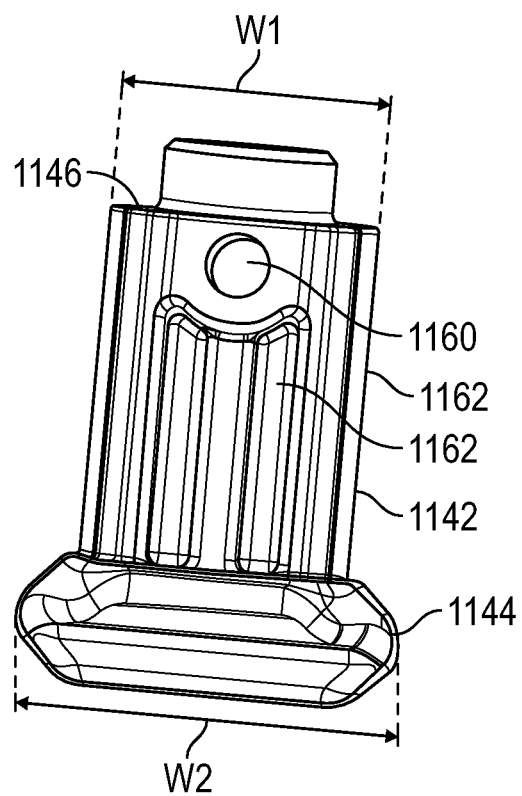
FIG. 11I is a side view of the plunger.

Referring now specifically to FIGS. 11F and 11G, the cam 1176 is shown in an unlocked position and locked position respectively. In the unlocked position illustrated in FIG. 11G, the cam 1176 is disposed away from the housing surface 1118C. This allows the plunger 1140 to have the foot 1144 extended outward from the housing 1112. The position of the cam 1176, in FIG. 11F, can somewhat float due to the action of the leaf spring 1150. The leaf spring 1150 provides an upward force but is compliant in the downward direction as well. The pin 1158 is engaged within the pin opening 1178.

In FIG. 11G, the outer surface of the cam 1176 rides on the leaf spring 1150 in an upward direction toward the surface 1118C. This action pushes the pin 1158 toward the surface 1118C within the plunger receiver 1138 to compress the coil spring 1148 within the plunger receiver 1138. Again, the leaf spring 1150 also allows the accommodation of different thicknesses of rails and the materials that form the rails 22. Thus, the retainer 1110 may accommodate different manufacturing tolerance of the rails 22 and the outer wall 24 forming the rails 22.

Referring now to FIG. 11H, the pin 1158 is shown within the slot 1156 of the plunger receiver 1138. In this example, the lever 1130 has been removed so the position of the pin 1158 within the slot 1156 is illustrated.

Figure 11J:
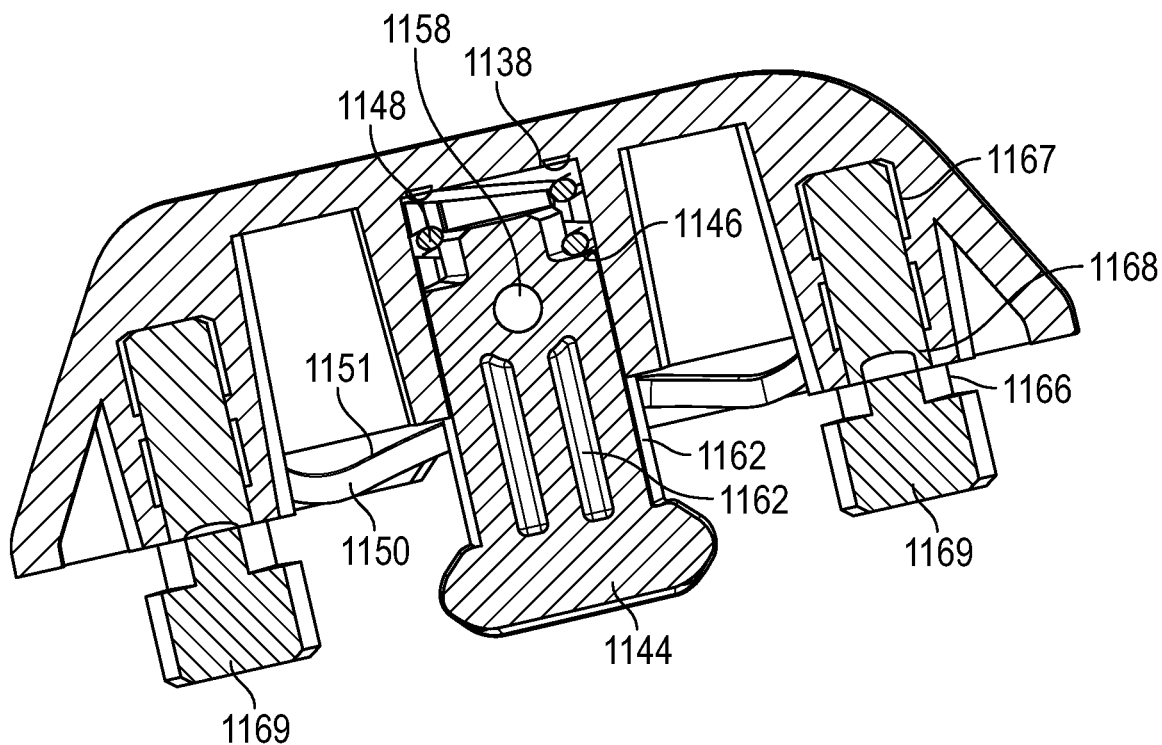
FIG. 11J is a cross sectional view through the middle of the housing 1112.

Referring now to FIG. 11J, a cross section view through the middle of the retainer 1110 is illustrated. The position of the coil spring 1148 relative to the plunger receiver 1138 and the shoulder 1146.

Figure 11K:
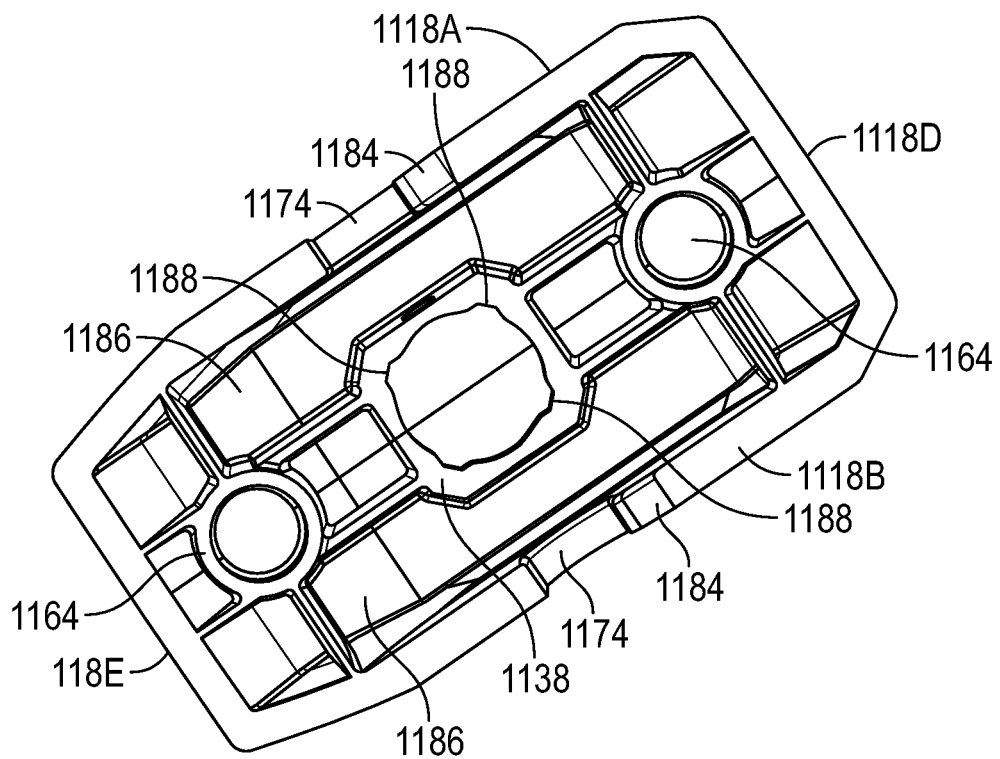
FIG. 11K is a bottom view of the housing 1112.

Referring now to FIG. 11K, the fastener receivers 1164 are illustrated in the housing 1112. The fastener receivers 1164 may be integrally formed or integrally molded as mentioned above. Also, the spring arms 1142A, 1142B may have each end disposed within the cavity 1186 that extends longitudinally relative to the housing 1112. The cavity 1186 extends on each side of the plunger receiver 1138.

The plunger receiver 1138 is shown as generally circular with alignment features 1188 formed therein. The alignment features 1188 of the plunger receiver 1138 are outwardly extending channels formed longitudinally within the inner surface of the plunger receiver 1138. Thus, the alignment features 1188 of the plunger receiver 1138 align with the alignment features 1162 of the plunger body 1142.

The stops 1184 are shown as a surface formed in the outer surfaces 1118A, 1118B.

Referring back to FIG. 11C, the device may be manufactured by placing the coil spring 1148 within the plunger receiver 1138. The pin 1158 is inserted into the pin hole 1160 so that the pin is received within the slot 1156. The handle flexes and is placed so that the pin openings 1178 receive the pin. That is, the cams 1176 are inserted within the lever openings 1174 so that pin 1158 is received within the pin opening 1178. The leaf spring 1150 is placed within the cavity 1186 so that the cam 1176 on each side of the lever 1130 is disposed between the leaf spring and the housing 1112. The fasteners 1166 as used to fasten the housing 1112 to an article 1114 and, more specifically, to the article wall 1116. Of course, a separate cover may be applied to the housing 1112 in place of or in addition to the article wall 1116. The heads 1169 thus extend outward from the housing 1112.

In operation, the retainer 1110 has the foot 1144 extending therefrom and is aligned with a receiver 18 in a rail 22. The foot is in an outward position relative to the housing 1112 and the lever 1130 is in the upright position. Some flexibility is allowed so that the foot 1144 can easily be aligned within the receiver 18. As the handle is rotated, the cam pushes the pin and thus the lever toward the surface 1118C, the foot 1144 engages the underside of the surface of the channel 26 so that the retainer 1110 maintains its position. As mentioned above, the flexibility of the leaf spring allows the foot 1144 to be engaged to a channel so that manufacturing tolerances are compensated therefor.

When the lever 1130 is moved in the clockwise most position relative to FIG. 11F, the foot 1144 is moved into the upward most position and the retainer 1110 is locked in place. When the lever 1130 is rotated in the counterclockwise direction, the foot 1144 disengages the channel 26 and the retainer 1110 is allow to slide freely within the channel.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A retainer system for coupling an article comprising:
    a retainer comprising;
    a housing comprising a plunger receiver having a slot disposed therein, and said housing comprising an outer wall comprising a lever opening;
    a plunger having a body at least partially and movably received within the plunger receiver and a foot disposed outside of the plunger receiver, said body comprising a pin opening;
    a pin disposed in the pin opening and the slot;
    a lever rotatably coupled to the housing at the lever opening and operably coupled to the plunger, said lever comprising a first end extending within the housing and is rotatably coupled to the housing, the lever comprising a second end, said first end rotating relative to the housing within the lever opening, said first end comprising a cam and a pin opening receiving the pin;
    a spring disposed between the housing and the plunger within the plunger receiver, said spring urging the foot away from the plunger receiver; and
    a cam engaging surface disposed within the housing retaining the first end of the lever in the lever opening.

2. The retainer system as recited in claim 1 wherein the lever comprises a first position wherein the plunger is retained within the plunger receiver in an inward position and the lever comprises a second position wherein the plunger is disposed in an outward position.

3. The retainer system as recited in claim 2 wherein the foot is disposed a first distance from the plunger receiver when the lever is in the first position and the foot of the plunger is disposed a second distance from the plunger receiver when the lever is in a second position greater than the first distance.

4. The retainer system as recited in claim 1 wherein the second end of the lever comprising a grip.

5. The retainer system as recited in claim 1 wherein the spring comprises a coil spring and wherein the body of the plunger comprises shoulders adjacent to the coil spring.

6. The retainer system as recited in claim 1 wherein the first end of the lever comprises a rotation limiter.

7. The retainer system as recited in claim 6 wherein the rotation limiter comprises a tab.

8. The retainer system as recited in claim 7 further comprising a first alignment feature extending from the housing.

9. The retainer system as recited in claim 8 further comprising a second alignment feature, said plunger disposed between the first alignment feature and the second alignment feature.

10. The retainer system as recited in claim 9 wherein the first alignment feature comprises a first fastener received within a first fastener receiver and wherein the second alignment feature comprises a second fastener received within a first fastener receiver.

11. The retainer system as recited in claim 10 wherein the first fastener and the second fastener couple the housing to the article.

12. The retainer system as recited in claim 1 wherein the cam engaging surface is disposed on a leaf spring.

13. The retainer system as recited in claim 12 wherein the leaf spring comprises spring arms on opposite sides of the plunger receiver.

14. The retainer system as recited in claim 13 wherein the leaf spring urges the cam into the lever opening in a direction opposite the foot when the lever is in a locked position.

15. The retainer system as recited in claim 1 wherein the retainer system comprises an outer wall having an elongated opening having a first width and a second opening having a second width greater than the first width.

16. The retainer system as recited in claim 15 wherein the foot of the plunger is at least partially disposed on an opposite side of the outer wall from the housing of the retainer.

17. The retainer system as recited in claim 16 wherein the plunger comprises the body of the plunger sized to be received within the elongated opening and the foot of the plunger is sized to engage the outer wall within a channel formed by the outer wall.

* * * * *